(12) United States Patent
Feingold

(10) Patent No.: US 7,756,896 B1
(45) Date of Patent: Jul. 13, 2010

(54) SYSTEM AND METHOD FOR MULTI-DIMENSIONAL RISK ANALYSIS

(75) Inventor: Vincent Feingold, Haledon, NJ (US)

(73) Assignee: JP Morgan Chase Bank, New York, NY (US)

( * ) Notice: Subject to any disclaimer, the term of this patent is extended or adjusted under 35 U.S.C. 154(b) by 983 days.

(21) Appl. No.: 11/100,841

(22) Filed: Apr. 7, 2005

Related U.S. Application Data

(63) Continuation-in-part of application No. 10/384,721, filed on Mar. 11, 2003.

(60) Provisional application No. 60/600,653, filed on Aug. 11, 2004, provisional application No. 60/363,641, filed on Mar. 11, 2002.

(51) Int. Cl.
*G06F 7/00* (2006.01)
*G06F 17/30* (2006.01)

(52) U.S. Cl. .................... 707/791; 707/705; 705/50

(58) Field of Classification Search .............. 707/2, 707/705, 791
See application file for complete search history.

(56) References Cited

U.S. PATENT DOCUMENTS

| | | | |
|---|---|---|---|
| 3,634,669 A | 1/1972 | Soumas et al. | |
| 3,713,235 A | 1/1973 | Roberts | |
| 3,946,206 A | 3/1976 | Darjany | |
| 4,047,033 A | 9/1977 | Malmberg et al. | |
| 4,058,220 A | 11/1977 | Torongo | |
| D248,203 S | 6/1978 | Morse | |
| 4,130,881 A | 12/1978 | Haessler et al. | |
| 4,205,780 A | 6/1980 | Burns | |
| 4,264,808 A | 4/1981 | Owens et al. | |
| 4,321,672 A | 3/1982 | Braun et al. | |
| 4,338,587 A | 7/1982 | Chiappetti | |
| 4,346,442 A | 8/1982 | Musmanno | |
| 4,355,372 A | 10/1982 | Johnson et al. | |

(Continued)

FOREIGN PATENT DOCUMENTS

EP 0597316 5/1994

(Continued)

OTHER PUBLICATIONS

5500—FDIC General Counsel's Opinion No. 8—Stored Value Cards, 61 Fed. Reg. 40490, http://www.FDIC.gov/regulations/laws/rules/5500-500.html, 08/02/199.

(Continued)

*Primary Examiner*—Apu M Mofiz
*Assistant Examiner*—Jared M Bibbee
(74) *Attorney, Agent, or Firm*—Lowenstein Sandler PC

(57) ABSTRACT

A risk analysis method uses a multi-dimensional risk representation that allows a standard OLAP engine to perform analysis on multi-dimensional data corresponding to a portfolio of financial positions. The analysis includes context-dependent, heterogeneous aggregation functions. The multi-dimensional data is represented as a multi-layered multi-dimensional cube ("outer" cube), which consists of dimensions and cells. Each cell includes a set of coordinates and an inner multi-dimensional cube ("inner" cube). Dimensions of the inner cube include all dimensions required for aggregations. Dimensions of the outer cube include only dimensions needed for context (or reporting). An aggregation is performed on the set of measures of the inner cube based on a context for the aggregation provided by the outer cube.

8 Claims, 17 Drawing Sheets

U.S. PATENT DOCUMENTS

| | | |
|---|---|---|
| 4,376,978 A | 3/1983 | Musmanno |
| 4,465,206 A | 8/1984 | Sorel et al. |
| 4,545,838 A | 10/1985 | Minkus et al. |
| 4,582,985 A | 4/1986 | Lofberg |
| 4,597,046 A | 6/1986 | Musmanno et al. |
| 4,598,367 A | 7/1986 | DeFrancesco et al. |
| 4,614,861 A | 9/1986 | Pavlov et al. |
| 4,634,845 A | 1/1987 | Hale et al. |
| 4,642,768 A | 2/1987 | Roberts |
| 4,643,452 A | 2/1987 | Chang et al. |
| 4,674,042 A | 6/1987 | Hernandez et al. |
| 4,674,044 A | 6/1987 | Kalmus et al. |
| 4,689,478 A | 8/1987 | Hale et al. |
| 4,700,055 A | 10/1987 | Kashkashian, Jr. |
| 4,736,294 A | 4/1988 | Gill et al. |
| 4,739,478 A | 4/1988 | Roberts et al. |
| 4,746,787 A | 5/1988 | Suto et al. |
| 4,750,119 A | 6/1988 | Cohen et al. |
| 4,754,418 A | 6/1988 | Hara |
| 4,760,604 A | 7/1988 | Cooper |
| 4,766,293 A | 8/1988 | Boston |
| 4,766,539 A | 8/1988 | Fox |
| 4,774,663 A | 9/1988 | Musmanno et al. |
| 4,774,664 A | 9/1988 | Campbell et al. |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs et al. |
| 4,837,422 A | 6/1989 | Dethloff et al. |
| 4,859,187 A | 8/1989 | Peterson |
| 4,859,837 A | 8/1989 | Halpern |
| 4,866,634 A | 9/1989 | Reboh |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,897,811 A | 1/1990 | Scofield |
| D305,887 S | 2/1990 | Nishimura |
| 4,903,201 A | 2/1990 | Wagner |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,943,707 A | 7/1990 | Boggan |
| 4,948,174 A | 8/1990 | Thomson et al. |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,972,504 A | 11/1990 | Daniel, Jr. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton et al. |
| 5,041,972 A | 8/1991 | Frost |
| 5,049,728 A | 9/1991 | Rovin |
| 5,054,096 A | 10/1991 | Beizer |
| 5,055,662 A | 10/1991 | Hasegawa |
| 5,080,748 A | 1/1992 | Bonomi |
| 5,093,907 A | 3/1992 | Hwong et al. |
| 5,095,194 A | 3/1992 | Barbanell |
| 5,117,355 A | 5/1992 | McCarthy |
| 5,121,945 A | 6/1992 | Thomson et al. |
| 5,146,068 A | 9/1992 | Ugawa et al. |
| 5,164,904 A | 11/1992 | Sumner |
| 5,180,901 A | 1/1993 | Hiramatsu |
| 5,185,697 A | 2/1993 | Jacobs et al. |
| 5,187,750 A | 2/1993 | Behera |
| 5,191,522 A | 3/1993 | Bosco et al. |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,220,500 A | 6/1993 | Baird |
| 5,227,874 A | 7/1993 | Von Kohorn |
| 5,231,571 A | 7/1993 | D'Agostino |
| 5,245,535 A | 9/1993 | Weiss et al. |
| 5,247,190 A | 9/1993 | Friend et al. |
| 5,276,311 A | 1/1994 | Hennige |
| 5,278,751 A | 1/1994 | Adiano et al. |
| 5,287,268 A | 2/1994 | McCarthy |
| 5,287,269 A | 2/1994 | Dorrough et al. |
| 5,297,026 A | 3/1994 | Hoffman |
| 5,297,032 A | 3/1994 | Trojan et al. |
| 5,309,321 A | 5/1994 | Olla et al. |
| 5,311,594 A | 5/1994 | Penzias |
| 5,321,933 A | 6/1994 | Seifert et al. |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,351,187 A | 9/1994 | Hassett |
| 5,359,183 A | 10/1994 | Skodlar |
| 5,361,062 A | 11/1994 | Weiss et al. |
| 5,365,575 A | 11/1994 | Katz |
| 5,381,470 A | 1/1995 | Cambray et al. |
| 5,383,113 A | 1/1995 | Knight et al. |
| 5,396,621 A | 3/1995 | MacGregor et al. |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,412,190 A | 5/1995 | Josephson et al. |
| 5,424,524 A | 6/1995 | Ruppert et al. |
| 5,444,794 A | 8/1995 | Uhland |
| 5,444,844 A | 8/1995 | Inoue |
| 5,450,477 A | 9/1995 | Amarant et al. |
| 5,453,601 A | 9/1995 | Rosen |
| 5,455,407 A | 10/1995 | Rosen |
| 5,459,306 A | 10/1995 | Stein et al. |
| 5,465,206 A | 11/1995 | Hilt et al. |
| 5,466,919 A | 11/1995 | Hovakimian |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,481,647 A | 1/1996 | Brody |
| 5,482,139 A | 1/1996 | Rivalto |
| 5,483,444 A | 1/1996 | Heintzeman et al. |
| 5,483,445 A | 1/1996 | Pickering |
| 5,490,060 A | 2/1996 | Malec |
| 5,500,514 A | 3/1996 | Veeneman et al. |
| 5,502,805 A | 3/1996 | Anderson et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,523,942 A | 6/1996 | Tyler et al. |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,550,734 A | 8/1996 | Tater |
| 5,551,021 A | 8/1996 | Harada |
| 5,553,120 A | 9/1996 | Katz |
| 5,577,109 A | 11/1996 | Stimson et al. |
| 5,578,808 A | 11/1996 | Taylor |
| 5,581,064 A | 12/1996 | Riley et al. |

| | | | | | |
|---|---|---|---|---|---|
| 5,583,778 A | 12/1996 | Wind | 5,742,775 A | 4/1998 | King |
| 5,585,787 A | 12/1996 | Wallerstein | 5,745,049 A | 4/1998 | Akiyama et al. |
| 5,592,560 A | 1/1997 | Deaton et al. | 5,745,706 A | 4/1998 | Wolfberg et al. |
| 5,592,590 A | 1/1997 | Jolly | 5,749,075 A | 5/1998 | Toader et al. |
| 5,603,025 A | 2/1997 | Tabb | 5,752,236 A | 5/1998 | Sexton et al. |
| 5,604,542 A | 2/1997 | Dedrick | 5,758,328 A | 5/1998 | Giovannoli |
| 5,606,496 A | 2/1997 | D'Agostino | 5,760,381 A | 6/1998 | Stich et al. |
| 5,608,785 A | 3/1997 | Kasday | 5,764,923 A | 6/1998 | Tallman et al. |
| 5,611,052 A | 3/1997 | Dykstra | 5,765,138 A | 6/1998 | Aycock et al. |
| 5,612,868 A | 3/1997 | Off | 5,765,141 A | 6/1998 | Spector |
| 5,615,109 A | 3/1997 | Eder | 5,765,144 A | 6/1998 | Larche |
| 5,615,341 A | 3/1997 | Agrawal et al. | 5,768,158 A | 6/1998 | Adler et al. |
| 5,619,558 A | 4/1997 | Jheeta | 5,770,843 A | 6/1998 | Rose et al. |
| 5,621,787 A | 4/1997 | McKoy et al. | 5,770,849 A | 6/1998 | Novis et al. |
| 5,621,812 A | 4/1997 | Deaton et al. | 5,774,870 A | 6/1998 | Storey |
| 5,623,591 A | 4/1997 | Cseri | 5,774,878 A | 6/1998 | Marshall |
| 5,637,845 A | 6/1997 | Kolls | 5,774,882 A | 6/1998 | Keen |
| 5,638,457 A | 6/1997 | Deaton et al. | 5,774,883 A | 6/1998 | Andersen et al. |
| 5,642,279 A | 6/1997 | Bloomberg et al. | 5,777,305 A | 7/1998 | Smith et al. |
| 5,642,485 A | 6/1997 | Deaton et al. | 5,777,306 A | 7/1998 | Masuda |
| 5,644,723 A | 7/1997 | Deaton et al. | 5,777,903 A | 7/1998 | Piosenka et al. |
| 5,644,727 A | 7/1997 | Atkins | 5,778,067 A | 7/1998 | Jones et al. |
| 5,649,114 A | 7/1997 | Deaton et al. | 5,787,156 A | 7/1998 | Katz |
| 5,649,116 A | 7/1997 | McCoy | 5,787,404 A | 7/1998 | Fernandez-Holman |
| 5,649,117 A | 7/1997 | Landry | 5,789,733 A | 8/1998 | Jachimowicz et al. |
| 5,649,118 A | 7/1997 | Carlisle et al. | 5,794,207 A | 8/1998 | Walker |
| 5,653,914 A | 8/1997 | Holmes et al. | 5,798,950 A | 8/1998 | Fitzgerald |
| 5,655,085 A | 8/1997 | Ryan et al. | 5,799,087 A | 8/1998 | Rosen |
| 5,657,388 A | 8/1997 | Weiss | 5,799,286 A | 8/1998 | Morgan et al. |
| 5,657,437 A | 8/1997 | Bishop et al. | 5,802,176 A | 9/1998 | Audebert |
| 5,657,460 A | 8/1997 | Egan et al. | 5,802,502 A | 9/1998 | Gell |
| 5,659,741 A | 8/1997 | Eberhardt | 5,805,719 A | 9/1998 | Pare et al. |
| 5,664,110 A | 9/1997 | Green et al. | 5,806,042 A | 9/1998 | Kelly et al. |
| 5,664,127 A | 9/1997 | Anderson et al. | 5,806,044 A | 9/1998 | Powell |
| 5,664,157 A | 9/1997 | Takahira et al. | 5,806,045 A | 9/1998 | Biorge |
| 5,665,953 A | 9/1997 | Mazzamuto | 5,807,627 A | 9/1998 | Friend et al. |
| 5,671,363 A | 9/1997 | Cristofich et al. | 5,809,478 A | 9/1998 | Greco |
| 5,672,678 A | 9/1997 | Holmes et al. | 5,812,968 A | 9/1998 | Hassan |
| 5,675,607 A | 10/1997 | Alesio et al. | 5,814,796 A | 9/1998 | Benson et al. |
| 5,675,662 A | 10/1997 | Deaton et al. | 5,815,657 A | 9/1998 | Williams et al. |
| 5,675,746 A | 10/1997 | Marshall | 5,815,658 A | 9/1998 | Kuriyama |
| 5,677,955 A | 10/1997 | Doggett et al. | 5,819,234 A | 10/1998 | Slavin et al. |
| 5,684,291 A | 11/1997 | Taskett | 5,819,237 A | 10/1998 | Garman |
| 5,687,322 A | 11/1997 | Deaton et al. | 5,832,457 A | 11/1998 | O'Brien |
| 5,689,100 A | 11/1997 | Carrithers et al. | 5,832,488 A | 11/1998 | Eberhardt |
| 5,689,650 A | 11/1997 | McClelland et al. | 5,835,061 A | 11/1998 | Stewart |
| 5,692,132 A | 11/1997 | Hogan | 5,835,576 A | 11/1998 | Katz |
| 5,696,907 A | 12/1997 | Tom | 5,839,113 A | 11/1998 | Federau et al. |
| 5,699,528 A | 12/1997 | Hogan | 5,842,178 A | 11/1998 | Giovannoli |
| 5,703,344 A | 12/1997 | Bezy et al. | 5,845,259 A | 12/1998 | West et al. |
| 5,704,046 A | 12/1997 | Hogan | 5,845,260 A | 12/1998 | Nakano et al. |
| 5,705,798 A | 1/1998 | Tarbox | 5,848,400 A | 12/1998 | Chang |
| 5,708,422 A | 1/1998 | Blonder et al. | 5,852,811 A | 12/1998 | Atkins |
| 5,710,458 A | 1/1998 | Iwasaki | 5,852,812 A | 12/1998 | Reeder |
| 5,710,886 A | 1/1998 | Christensen et al. | 5,857,079 A | 1/1999 | Claus et al. |
| 5,710,887 A | 1/1998 | Chelliah et al. | 5,857,175 A | 1/1999 | Day |
| 5,710,889 A | 1/1998 | Clark et al. | 5,857,709 A | 1/1999 | Chock |
| 5,715,399 A | 2/1998 | Bezos | 5,859,419 A | 1/1999 | Wynn |
| 5,717,865 A | 2/1998 | Stratmann | 5,864,609 A | 1/1999 | Cross et al. |
| 5,717,925 A | 2/1998 | Harper et al. | 5,864,828 A | 1/1999 | Atkins |
| 5,721,768 A | 2/1998 | Stimson et al. | 5,864,830 A | 1/1999 | Armetta et al. |
| 5,721,781 A | 2/1998 | Deo et al. | 5,870,718 A | 2/1999 | Spector |
| 5,721,847 A | 2/1998 | Johnson | 5,870,721 A | 2/1999 | Norris |
| 5,727,161 A | 3/1998 | Purcell, Jr. | 5,873,096 A | 2/1999 | Lim et al. |
| 5,728,998 A | 3/1998 | Novis et al. | 5,875,437 A | 2/1999 | Atkins |
| 5,729,693 A | 3/1998 | Holda-Fleck | 5,878,258 A | 3/1999 | Pizi |
| 5,732,397 A | 3/1998 | DeTore | 5,878,403 A | 3/1999 | DeFrancesco et al. |
| 5,732,400 A | 3/1998 | Mandler et al. | 5,883,377 A | 3/1999 | Chapin, Jr. |
| 5,734,154 A | 3/1998 | Jachimowicz et al. | 5,884,278 A | 3/1999 | Powell |
| 5,734,838 A | 3/1998 | Robinson | 5,884,285 A | 3/1999 | Atkins |
| 5,736,728 A | 4/1998 | Matsubara | 5,887,065 A | 3/1999 | Audebert |
| 5,737,421 A | 4/1998 | Audebert | 5,890,138 A | 3/1999 | Godin et al. |
| 5,740,549 A | 4/1998 | Reilly et al. | 5,890,140 A | 3/1999 | Clark et al. |

| Patent | Kind | Date | Inventor |
|---|---|---|---|
| H1794 | H | 4/1999 | Claus |
| 5,893,079 | A | 4/1999 | Cwenar |
| 5,897,620 | A | 4/1999 | Walker et al. |
| 5,897,621 | A | 4/1999 | Boesch et al. |
| 5,905,246 | A | 5/1999 | Fajkowski |
| 5,907,350 | A | 5/1999 | Nemirofsky |
| 5,911,135 | A | 6/1999 | Atkins |
| 5,911,136 | A | 6/1999 | Atkins |
| 5,913,202 | A | 6/1999 | Motoyama |
| 5,914,472 | A | 6/1999 | Foladare et al. |
| 5,918,217 | A | 6/1999 | Maggioncalda |
| 5,920,629 | A | 7/1999 | Rosen |
| 5,920,844 | A | 7/1999 | Hotta et al. |
| 5,920,847 | A | 7/1999 | Kolling et al. |
| 5,920,848 | A | 7/1999 | Schutzer |
| 5,923,734 | A | 7/1999 | Taskett |
| 5,924,094 | A | 7/1999 | Sutter |
| 5,926,800 | A | 7/1999 | Baronowski et al. |
| 5,930,217 | A | 7/1999 | Kayanuma |
| 5,930,775 | A | 7/1999 | McCauley |
| 5,931,764 | A | 8/1999 | Freeman et al. |
| 5,933,817 | A | 8/1999 | Hucal |
| 5,937,068 | A | 8/1999 | Audebert |
| 5,940,811 | A | 8/1999 | Norris |
| 5,940,812 | A | 8/1999 | Tengel et al. |
| 5,946,669 | A | 8/1999 | Polk |
| 5,950,175 | A | 9/1999 | Austin |
| 5,952,641 | A | 9/1999 | Korshun |
| 5,953,423 | A | 9/1999 | Rosen |
| 5,953,710 | A | 9/1999 | Fleming |
| 5,955,961 | A | 9/1999 | Wallerstein |
| 5,956,695 | A | 9/1999 | Carrithers et al. |
| 5,963,648 | A | 10/1999 | Rosen |
| 5,963,953 | A | 10/1999 | Cram et al. |
| 5,970,467 | A | 10/1999 | Alavi |
| 5,970,479 | A | 10/1999 | Shepherd |
| 5,970,480 | A | 10/1999 | Kalina |
| 5,974,396 | A | 10/1999 | Anderson et al. |
| 5,974,399 | A | 10/1999 | Giuliani et al. |
| RE36,365 | E | 11/1999 | Levine et al. |
| 5,978,779 | A | 11/1999 | Stein et al. |
| 5,983,206 | A | 11/1999 | Oppenheimer |
| 5,984,180 | A | 11/1999 | Albrecht |
| 5,984,191 | A | 11/1999 | Chapin, Jr. |
| 5,987,434 | A | 11/1999 | Libman |
| 5,988,509 | A | 11/1999 | Taskett |
| 5,991,413 | A | 11/1999 | Arditti et al. |
| 5,991,741 | A | 11/1999 | Speakman et al. |
| 5,991,743 | A | 11/1999 | Irving et al. |
| 5,991,748 | A | 11/1999 | Taskett |
| 5,991,750 | A | 11/1999 | Watson |
| 5,995,942 | A | 11/1999 | Smith et al. |
| 5,999,907 | A | 12/1999 | Donner |
| 6,000,608 | A | 12/1999 | Dorf |
| 6,000,832 | A | 12/1999 | Franklin et al. |
| 6,002,383 | A | 12/1999 | Shimada |
| 6,003,762 | A | 12/1999 | Hayashida |
| 6,004,681 | A | 12/1999 | Epstein et al. |
| 6,006,988 | A | 12/1999 | Behrmann et al. |
| 6,008,817 | A | 12/1999 | Gilmore, Jr. |
| 6,009,415 | A | 12/1999 | Shurling et al. |
| 6,014,636 | A | 1/2000 | Reeder |
| 6,014,638 | A | 1/2000 | Burge et al. |
| 6,014,645 | A | 1/2000 | Cunningham |
| 6,014,749 | A | 1/2000 | Gloor et al. |
| 6,016,482 | A | 1/2000 | Molinari et al. |
| 6,016,954 | A | 1/2000 | Abe et al. |
| 6,018,722 | A | 1/2000 | Ray et al. |
| 6,019,284 | A | 2/2000 | Freeman et al. |
| 6,021,189 | A | 2/2000 | Vu |
| 6,021,397 | A | 2/2000 | Jones et al. |
| 6,026,370 | A | 2/2000 | Jermyn |
| 6,029,139 | A | 2/2000 | Cunningham et al. |
| 6,029,144 | A | 2/2000 | Barrett et al. |
| 6,029,195 | A | 2/2000 | Herz |
| 6,029,890 | A | 2/2000 | Austin |
| 6,032,125 | A | 2/2000 | Ando |
| 6,032,136 | A | 2/2000 | Brake, Jr. et al. |
| 6,032,859 | A | 3/2000 | Muehlberger et al. |
| 6,036,099 | A | 3/2000 | Leighton |
| 6,038,292 | A | 3/2000 | Thomas |
| 6,038,552 | A | 3/2000 | Fleischl et al. |
| 6,041,315 | A | 3/2000 | Pollin |
| 6,044,360 | A | 3/2000 | Picciallo |
| 6,044,371 | A | 3/2000 | Person et al. |
| 6,045,042 | A | 4/2000 | Ohno |
| 6,047,067 | A | 4/2000 | Rosen |
| 6,047,268 | A | 4/2000 | Bartoli et al. |
| 6,049,463 | A | 4/2000 | O'Malley et al. |
| 6,049,773 | A | 4/2000 | McCormack et al. |
| 6,049,782 | A | 4/2000 | Gottesman et al. |
| 6,055,510 | A | 4/2000 | Henrick |
| 6,055,517 | A | 4/2000 | Friend et al. |
| 6,058,378 | A | 5/2000 | Clark et al. |
| 6,064,985 | A | 5/2000 | Anderson |
| 6,065,675 | A | 5/2000 | Teicher |
| 6,068,183 | A | 5/2000 | Freeman et al. |
| 6,070,067 | A | 5/2000 | Nguyen et al. |
| 6,070,147 | A | 5/2000 | Harms et al. |
| 6,070,153 | A | 5/2000 | Simpson |
| 6,073,115 | A | 6/2000 | Marshall |
| 6,076,068 | A | 6/2000 | DeLapa et al. |
| 6,076,072 | A | 6/2000 | Libman |
| 6,078,888 | A | 6/2000 | Johnson, Jr. |
| 6,078,891 | A | 6/2000 | Riordan et al. |
| 6,078,892 | A | 6/2000 | Anderson et al. |
| 6,078,901 | A | 6/2000 | Ching |
| 6,088,686 | A | 7/2000 | Walker et al. |
| 6,089,284 | A | 7/2000 | Kaehler et al. |
| 6,091,817 | A | 7/2000 | Bertina et al. |
| 6,092,050 | A | 7/2000 | Lungren et al. |
| 6,092,056 | A | 7/2000 | Tull, Jr. et al. |
| 6,095,412 | A | 8/2000 | Bertina et al. |
| 6,095,416 | A | 8/2000 | Grant et al. |
| 6,097,391 | A | 8/2000 | Wilcox |
| 6,098,053 | A | 8/2000 | Slater |
| 6,105,011 | A | 8/2000 | Morrison, Jr. |
| 6,105,865 | A | 8/2000 | Hardesty |
| 6,108,641 | A | 8/2000 | Kenna et al. |
| 6,109,525 | A | 8/2000 | Blomqvist et al. |
| 6,112,191 | A | 8/2000 | Burke |
| 6,115,458 | A | 9/2000 | Taskett |
| 6,115,697 | A | 9/2000 | Gottstein |
| 6,119,103 | A | 9/2000 | Basch et al. |
| 6,119,107 | A | 9/2000 | Polk |
| 6,119,932 | A | 9/2000 | Maloney et al. |
| 6,122,623 | A | 9/2000 | Garman |
| 6,128,598 | A | 10/2000 | Walker et al. |
| 6,128,599 | A | 10/2000 | Walker et al. |
| 6,129,274 | A | 10/2000 | Suzuki |
| 6,129,572 | A | 10/2000 | Felman et al. |
| 6,134,309 | A | 10/2000 | Carson |
| 6,134,536 | A | 10/2000 | Shepherd |
| 6,138,917 | A | 10/2000 | Chapin, Jr. |
| 6,145,741 | A | 11/2000 | Wisdom et al. |
| 6,148,297 | A | 11/2000 | Swor et al. |
| 6,154,731 | A | 11/2000 | Monks et al. |
| 6,161,096 | A | 12/2000 | Bell |
| 6,161,098 | A | 12/2000 | Wallman |
| 6,163,770 | A | 12/2000 | Gamble et al. |
| 6,164,533 | A | 12/2000 | Barton |
| 6,167,378 | A | 12/2000 | Webber, Jr. |
| 6,167,385 | A | 12/2000 | Hartley-Urquhart |
| 6,169,975 | B1 | 1/2001 | White et al. |
| 6,173,267 | B1 | 1/2001 | Cairns |
| 6,173,270 | B1 | 1/2001 | Cristofich et al. |

| | | |
|---|---|---|
| 6,182,048 B1 | 1/2001 | Osborn et al. |
| 6,182,894 B1 | 2/2001 | Hackett et al. |
| 6,183,140 B1 | 2/2001 | Singer et al. |
| 6,185,582 B1 | 2/2001 | Zellweger et al. |
| 6,186,793 B1 | 2/2001 | Brubaker |
| 6,188,403 B1 | 2/2001 | Sacerdoti et al. |
| 6,188,405 B1 | 2/2001 | Czerwinski et al. |
| 6,188,993 B1 | 2/2001 | Eng et al. |
| 6,189,787 B1 | 2/2001 | Dorf |
| 6,192,113 B1 | 2/2001 | Lorsch |
| 6,195,092 B1 | 2/2001 | Dhond et al. |
| 6,195,644 B1 | 2/2001 | Bowie |
| 6,199,077 B1 | 3/2001 | Inala et al. |
| 6,202,053 B1 | 3/2001 | Christiansen et al. |
| 6,202,054 B1 | 3/2001 | Lawlor et al. |
| 6,205,453 B1 | 3/2001 | Tucker et al. |
| RE37,122 E | 4/2001 | Levine et al. |
| 6,212,494 B1 | 4/2001 | Boguraev |
| 6,213,392 B1 | 4/2001 | Zuppichich |
| 6,222,557 B1 | 4/2001 | Pulley, IV et al. |
| 6,223,143 B1 | 4/2001 | Weinstock et al. |
| 6,227,447 B1 | 5/2001 | Campisano |
| 6,236,978 B1 | 5/2001 | Tuzhilin |
| 6,243,093 B1 | 6/2001 | Czerwinski et al. |
| 6,243,688 B1 | 6/2001 | Kalina |
| 6,249,775 B1 | 6/2001 | Freeman et al. |
| 6,256,649 B1 | 7/2001 | Mackinlay et al. |
| 6,260,758 B1 | 7/2001 | Blumberg |
| 6,263,316 B1 | 7/2001 | Khan et al. |
| 6,263,320 B1 | 7/2001 | Danilunas et al. |
| 6,263,321 B1 | 7/2001 | Daughtery, III |
| 6,265,977 B1 | 7/2001 | Vega et al. |
| 6,269,346 B1 | 7/2001 | Cristofich et al. |
| 6,271,863 B1 | 8/2001 | Bose et al. |
| 6,278,981 B1 | 8/2001 | Dembo et al. |
| 6,282,551 B1 | 8/2001 | Anderson et al. |
| 6,289,322 B1 | 9/2001 | Kitchen et al. |
| 6,295,344 B1 | 9/2001 | Marshall |
| 6,295,522 B1 | 9/2001 | Boesch |
| 6,298,336 B1 | 10/2001 | Davis et al. |
| 6,304,858 B1 | 10/2001 | Mosler et al. |
| 6,308,268 B1 | 10/2001 | Audebert |
| 6,311,144 B1 | 10/2001 | Abu El Ata |
| 6,317,726 B1 | 11/2001 | O'Shaughnessy |
| 6,317,750 B1 | 11/2001 | Tortolani et al. |
| 6,321,212 B1 | 11/2001 | Lange |
| 6,324,524 B1 | 11/2001 | Lent et al. |
| 6,330,546 B1 | 12/2001 | Gopinathan et al. |
| 6,330,551 B1 | 12/2001 | Burchetta et al. |
| 6,332,135 B1 | 12/2001 | Conklin et al. |
| 6,336,099 B1 | 1/2002 | Barnett et al. |
| 6,336,105 B1 | 1/2002 | Conklin et al. |
| 6,338,048 B1 | 1/2002 | Mori |
| 6,338,050 B1 | 1/2002 | Conklin et al. |
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,290 B1 | 2/2002 | Horowitz et al. |
| 6,349,291 B1 | 2/2002 | Varma |
| 6,360,188 B1 | 3/2002 | Freidman et al. |
| 6,360,210 B1 | 3/2002 | Wallman |
| 6,360,954 B1 | 3/2002 | Barnardo |
| 6,363,393 B1 | 3/2002 | Ribitzky |
| 6,366,220 B1 | 4/2002 | Elliott |
| 6,373,969 B1 | 4/2002 | Adler |
| 6,374,230 B1 | 4/2002 | Walker et al. |
| 6,377,669 B1 | 4/2002 | Walker et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,401,079 B1 | 6/2002 | Kahn et al. |
| 6,402,039 B1 | 6/2002 | Freeman et al. |
| 6,405,182 B1 | 6/2002 | Cuervo |
| 6,405,204 B1 | 6/2002 | Baker et al. |
| 6,411,939 B1 | 6/2002 | Parsons |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| 6,440,933 B1 | 8/2002 | Bodor et al. |
| D462,477 S | 9/2002 | Osborne |
| 6,446,210 B1 | 9/2002 | Borza |
| 6,450,407 B1 | 9/2002 | Freeman et al. |
| 6,452,613 B1 | 9/2002 | Lefebvre et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,473,745 B2 | 10/2002 | Doerr et al. |
| 6,481,125 B1 | 11/2002 | Pokrasoff |
| 6,484,144 B2 | 11/2002 | Martin et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,490,568 B1 | 12/2002 | Omara et al. |
| 6,490,569 B1 | 12/2002 | Grune et al. |
| 6,496,832 B2 | 12/2002 | Chi et al. |
| 6,498,861 B1 | 12/2002 | Hamid et al. |
| 6,502,080 B1 | 12/2002 | Eichorst et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,513,018 B1 | 1/2003 | Culhane |
| 6,529,880 B1 | 3/2003 | McKeen et al. |
| D474,235 S | 5/2003 | Haas |
| 6,557,750 B1 | 5/2003 | Druse et al. |
| 6,557,766 B1 | 5/2003 | Leighton |
| 6,560,578 B2 | 5/2003 | Eldering |
| 6,561,657 B1 | 5/2003 | Schofield |
| 6,564,214 B1 | 5/2003 | Bhide |
| 6,567,786 B1 | 5/2003 | Bibelnieks et al. |
| 6,567,821 B1 | 5/2003 | Polk |
| 6,574,603 B1 | 6/2003 | Dickson et al. |
| 6,581,839 B1 | 6/2003 | Lasch et al. |
| D476,681 S | 7/2003 | Al Amri |
| D477,359 S | 7/2003 | Haas |
| 6,597,379 B1 | 7/2003 | Morris et al. |
| 6,601,040 B1 | 7/2003 | Kolls |
| 6,601,044 B1 | 7/2003 | Wallman |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,624,752 B2 | 9/2003 | Klitsgaard et al. |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,687,222 B1 | 2/2004 | Albert et al. |
| 6,693,544 B1 | 2/2004 | Hebbecker |
| 6,725,257 B1 | 4/2004 | Cansler et al. |
| 6,732,919 B2 | 5/2004 | Macklin et al. |
| 6,738,933 B2 | 5/2004 | Fraenkel et al. |
| 6,741,975 B1 | 5/2004 | Nakisa et al. |
| 6,742,704 B2 | 6/2004 | Fitzmaurice et al. |
| 6,745,938 B2 | 6/2004 | Sullivan |

| | | | | | | |
|---|---|---|---|---|---|---|
| 6,757,660 | B2 | 6/2004 | Canada et al. | 2002/0019791 A1 | 2/2002 | Goss et al. |
| 6,757,710 | B2 | 6/2004 | Reed | 2002/0019793 A1 | 2/2002 | Frattalone |
| 6,785,661 | B1 | 8/2004 | Dixon et al. | 2002/0019802 A1 | 2/2002 | Malme et al. |
| D495,736 | S | 9/2004 | Scharf | 2002/0019803 A1 | 2/2002 | Muller |
| 6,793,135 | B1 | 9/2004 | Ryoo | 2002/0026418 A1 | 2/2002 | Koppel et al. |
| 6,802,008 | B1 | 10/2004 | Ikefuji et al. | 2002/0032609 A1 | 3/2002 | Wilkman |
| 6,805,287 | B2 | 10/2004 | Bishop | 2002/0046089 A1 | 4/2002 | Zorn |
| 6,850,923 | B1 | 2/2005 | Nakisa et al. | 2002/0046255 A1 | 4/2002 | Moore et al. |
| 6,856,973 | B1 | 2/2005 | Bott | 2002/0059093 A1 | 5/2002 | Barton et al. |
| 6,865,547 | B1 | 3/2005 | Brake, Jr. et al. | 2002/0059139 A1 | 5/2002 | Evans |
| 6,868,426 | B1 | 3/2005 | Mankoff | 2002/0062235 A1 | 5/2002 | Wahlbin et al. |
| 6,876,971 | B1 | 4/2005 | Burke | 2002/0065720 A1 | 5/2002 | Carswell et al. |
| D505,450 | S | 5/2005 | Lauer et al. | 2002/0067373 A1 | 6/2002 | Roe et al. |
| 6,892,052 | B2 | 5/2005 | Kotola et al. | 2002/0073005 A1 | 6/2002 | Welnicki et al. |
| 6,895,383 | B2 | 5/2005 | Heinrich | 2002/0077964 A1 | 6/2002 | Brody et al. |
| 6,895,386 | B1 | 5/2005 | Bachman | 2002/0077978 A1 | 6/2002 | O'Leary et al. |
| 6,901,372 | B1 | 5/2005 | Helzerman | 2002/0078086 A1 | 6/2002 | Alden et al. |
| 6,912,502 | B1 | 6/2005 | Buddle et al. | 2002/0082990 A1 | 6/2002 | Jones |
| 6,970,830 | B1 | 11/2005 | Samra et al. | 2002/0087516 A1 * | 7/2002 | Cras et al. ............ 707/2 |
| 6,978,369 | B2 | 12/2005 | Wheeler et al. | 2002/0091572 A1 | 7/2002 | Anderson et al. |
| 6,985,880 | B1 | 1/2006 | Hodgdon et al. | 2002/0091621 A1 | 7/2002 | Conklin et al. |
| 6,999,943 | B1 | 2/2006 | Johnson et al. | 2002/0091631 A1 | 7/2002 | Usui |
| 7,006,978 | B2 | 2/2006 | Lineberry et al. | 2002/0095365 A1 | 7/2002 | Slavin et al. |
| 7,006,992 | B1 | 2/2006 | Packwood | 2002/0099586 A1 | 7/2002 | Bladen et al. |
| 7,051,925 | B2 | 5/2006 | Schwarz | 2002/0104878 A1 | 8/2002 | Seifert et al. |
| 7,072,909 | B2 | 7/2006 | Polk | 2002/0111850 A1 | 8/2002 | Smrckas et al. |
| 7,089,207 | B1 | 8/2006 | Lardy et al. | 2002/0111890 A1 | 8/2002 | Sloan et al. |
| 7,089,503 | B1 | 8/2006 | Bloomquist et al. | 2002/0111916 A1 | 8/2002 | Coronna et al. |
| 7,092,905 | B2 | 8/2006 | Behrenbrinker et al. | 2002/0116271 A1 | 8/2002 | Mankoff |
| 7,092,916 | B2 | 8/2006 | Diveley | 2002/0116330 A1 | 8/2002 | Hed et al. |
| 7,104,443 | B1 | 9/2006 | Paul et al. | 2002/0120627 A1 | 8/2002 | Mankoff |
| 7,107,249 | B2 | 9/2006 | Dively | 2002/0120642 A1 | 8/2002 | Fetherston |
| 7,113,914 | B1 | 9/2006 | Spielmann et al. | 2002/0129221 A1 | 9/2002 | Borgin et al. |
| 7,124,105 | B2 | 10/2006 | Hilton | 2002/0133383 A1 | 9/2002 | Chao et al. |
| 7,133,846 | B1 | 11/2006 | Ginter et al. | 2002/0138418 A1 | 9/2002 | Zarin et al. |
| D533,220 | S | 12/2006 | Graves et al. | 2002/0143703 A1 | 10/2002 | Razvan et al. |
| 7,165,049 | B2 | 1/2007 | Slater | 2002/0147662 A1 | 10/2002 | Anderson |
| 7,171,385 | B1 * | 1/2007 | Dembo et al. ............ 705/36 R | 2002/0147668 A1 | 10/2002 | Smith et al. |
| D538,349 | S | 3/2007 | Hollands | 2002/0152157 A1 | 10/2002 | Stoyanov et al. |
| 7,216,091 | B1 | 5/2007 | Blandina et al. | 2002/0156723 A1 | 10/2002 | Lilly et al. |
| 7,225,153 | B2 | 5/2007 | Lange | 2002/0165820 A1 | 11/2002 | Anvekar et al. |
| 7,225,155 | B1 | 5/2007 | Polk | 2002/0169719 A1 | 11/2002 | Dively et al. |
| 7,236,951 | B2 | 6/2007 | Lipton et al. | 2002/0174016 A1 | 11/2002 | Cuervo |
| 7,243,839 | B2 | 7/2007 | Beck et al. | 2002/0174018 A1 | 11/2002 | Bunger et al. |
| 7,249,092 | B2 | 7/2007 | Dunn et al. | 2002/0174045 A1 | 11/2002 | Arena et al. |
| 7,252,223 | B2 | 8/2007 | Schofield | 2002/0178025 A1 | 11/2002 | Hansen et al. |
| 7,256,903 | B2 | 8/2007 | Ando | 2002/0194081 A1 | 12/2002 | Perkowski |
| D551,705 | S | 9/2007 | Mershon | 2002/0198797 A1 | 12/2002 | Cooper et al. |
| 7,295,999 | B1 | 11/2007 | Simon et al. | 2003/0004828 A1 | 1/2003 | Epstein |
| 7,315,843 | B2 | 1/2008 | Dively et al. | 2003/0018492 A1 | 1/2003 | Carlson |
| 7,340,431 | B1 * | 3/2008 | McManus et al. ............ 705/37 | 2003/0018558 A1 | 1/2003 | Heffner et al. |
| 7,346,567 | B2 | 3/2008 | Weeks | 2003/0018613 A1 | 1/2003 | Oytac |
| 7,349,877 | B2 | 3/2008 | Ballow et al | 2003/0023549 A1 | 1/2003 | Armes et al. |
| 7,392,222 | B1 | 6/2008 | Hamilton et al. | 2003/0028466 A1 | 2/2003 | Jenson et al. |
| 7,392,224 | B1 | 6/2008 | Bauer et al. | 2003/0028518 A1 | 2/2003 | Mankoff |
| 7,409,364 | B1 | 8/2008 | Barton et al. | 2003/0033211 A1 | 2/2003 | Haines et al. |
| 7,496,624 | B2 | 2/2009 | Falter et al. | 2003/0046249 A1 | 3/2003 | Wu |
| 2001/0011227 | A1 | 8/2001 | Ashery et al. | 2003/0053669 A1 | 3/2003 | Risafi et al. |
| 2001/0011243 | A1 | 8/2001 | Dembo et al. | 2003/0055754 A1 | 3/2003 | Sullivan |
| 2001/0025264 | A1 | 9/2001 | Deaddio et al. | 2003/0061132 A1 | 3/2003 | Yu, Sr. et al. |
| 2001/0027389 | A1 | 10/2001 | Beverina et al. | 2003/0061137 A1 | 3/2003 | Leung et al. |
| 2001/0027437 | A1 | 10/2001 | Turbeville et al. | 2003/0074167 A1 * | 4/2003 | Browne et al. ................ 703/2 |
| 2001/0027441 | A1 | 10/2001 | Wankmueller | 2003/0074290 A1 | 4/2003 | Clore |
| 2001/0034647 | A1 | 10/2001 | Marks et al. | 2003/0093351 A1 | 5/2003 | Sarabanchong |
| 2001/0034682 | A1 | 10/2001 | Knight et al. | 2003/0093408 A1 | 5/2003 | Brown et al. |
| 2001/0037268 | A1 | 11/2001 | Miller | 2003/0101119 A1 | 5/2003 | Persons et al. |
| 2001/0037315 | A1 | 11/2001 | Saliba et al. | 2003/0105672 A1 | 6/2003 | Epstein et al. |
| 2001/0044293 | A1 | 11/2001 | Morgan | 2003/0110111 A1 | 6/2003 | Nalebuff et al. |
| 2001/0047332 | A1 | 11/2001 | Gonen-Friedman et al. | 2003/0135462 A1 | 7/2003 | Brake, Jr. et al. |
| 2001/0047342 | A1 | 11/2001 | Cuervo | 2003/0139827 A1 | 7/2003 | Phelps |
| 2001/0054003 | A1 | 12/2001 | Chien et al. | 2003/0140004 A1 | 7/2003 | O'Leary et al. |
| 2001/0056398 | A1 | 12/2001 | Scheirer | 2003/0144935 A1 | 7/2003 | Sobek |
| 2002/0007330 | A1 | 1/2002 | Kumar et al. | 2003/0149659 A1 | 8/2003 | Danaher et al. |

| | | |
|---|---|---|
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195780 A1 | 10/2003 | Arora et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0208429 A1 | 11/2003 | Bennett |
| 2003/0212628 A1 | 11/2003 | Kuttan et al. |
| 2003/0216965 A1 | 11/2003 | Libman |
| 2003/0229525 A1 | 12/2003 | Callahan et al. |
| 2004/0019540 A1 | 1/2004 | William et al. |
| 2004/0019541 A1 | 1/2004 | William et al. |
| 2004/0024665 A1 | 2/2004 | Foster |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0054622 A1 | 3/2004 | Strayer et al. |
| 2004/0059952 A1 | 3/2004 | Newport et al. |
| 2004/0064402 A1 | 4/2004 | Dreyer et al. |
| 2004/0093296 A1 | 5/2004 | Phelan et al. |
| 2004/0093303 A1 | 5/2004 | Picciallo |
| 2004/0098351 A1 | 5/2004 | Duke |
| 2004/0103431 A1 | 5/2004 | Davenport et al. |
| 2004/0117300 A1 | 6/2004 | Jones et al. |
| 2004/0118914 A1 | 6/2004 | Smith et al. |
| 2004/0128186 A1 | 7/2004 | Breslin et al. |
| 2004/0186773 A1 | 9/2004 | George et al. |
| 2004/0193539 A1 | 9/2004 | Sullivan |
| 2004/0215507 A1 | 10/2004 | Levitt et al. |
| 2004/0236641 A1 | 11/2004 | Abbott et al. |
| 2004/0243498 A1 | 12/2004 | Duke |
| 2004/0267651 A1 | 12/2004 | Jensen et al. |
| 2005/0004855 A1 | 1/2005 | Jensen et al. |
| 2005/0004856 A1 | 1/2005 | Brose et al. |
| 2005/0010510 A1 | 1/2005 | Brose et al. |
| 2005/0015360 A1* | 1/2005 | Cras et al. ............. 707/2 |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027632 A1 | 2/2005 | Zeitoun et al. |
| 2005/0027649 A1 | 2/2005 | Cech |
| 2005/0035192 A1 | 2/2005 | Bonalle et al. |
| 2005/0060252 A1 | 3/2005 | Doddington |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0091138 A1 | 4/2005 | Awatsu |
| 2005/0102228 A1 | 5/2005 | Srinivasan et al. |
| 2005/0108152 A1 | 5/2005 | Tsao Lee et al. |
| 2005/0144108 A1 | 6/2005 | Loeper |
| 2005/0171898 A1 | 8/2005 | Bishop et al. |
| 2005/0199705 A1 | 9/2005 | Beck et al. |
| 2005/0209939 A1 | 9/2005 | Joseph et al. |
| 2005/0234771 A1 | 10/2005 | Register et al. |
| 2005/0234807 A1 | 10/2005 | Toffey |
| 2005/0269396 A1 | 12/2005 | Schofield |
| 2006/0026092 A1 | 2/2006 | Klein et al. |
| 2006/0047573 A1 | 3/2006 | Mitchell et al. |
| 2006/0047589 A1 | 3/2006 | Grau |
| 2006/0074794 A1 | 4/2006 | Nespola |
| 2006/0085334 A1 | 4/2006 | Murphy |
| 2006/0116903 A1 | 6/2006 | Becerra |
| 2006/0131869 A1 | 6/2006 | Brignull |
| 2006/0224480 A1 | 10/2006 | Bent et al. |
| 2006/0242057 A1 | 10/2006 | Velarde |
| 2006/0251478 A1 | 11/2006 | Desmeules |
| 2007/0011176 A1 | 1/2007 | Vishnubhotla |
| 2007/0124227 A1* | 5/2007 | Dembo et al. ............. 705/36 R |
| 2008/0177659 A1 | 7/2008 | Lacey et al. |

FOREIGN PATENT DOCUMENTS

| | | |
|---|---|---|
| EP | 0843292 | 5/1998 |
| EP | 0855659 | 7/1998 |
| EP | 0959440 | 11/1999 |
| GB | 2275654 | 9/1994 |
| GB | 2376787 | 12/2002 |
| GB | 2377071 | 12/2002 |
| GB | 2377314 | 1/2003 |
| JP | 2002-163589 | 6/2002 |
| JP | 2005-122748 | 5/2005 |
| WO | WO94/29112 | 12/1994 |
| WO | WO97/41673 | 11/1997 |
| WO | WO22/93321 | 6/1998 |
| WO | 98/59307 | 12/1998 |
| WO | WO99/05633 | 2/1999 |
| WO | 99/27479 | 6/1999 |
| WO | 99/54841 | 10/1999 |
| WO | WO95/09440 | 11/1999 |
| WO | WO00/02256 | 1/2000 |
| WO | 01/18699 | 3/2001 |
| WO | WO01/69347 A2 | 9/2001 |
| WO | WO01/69347 A3 | 9/2001 |
| WO | WO02/069212 A2 | 9/2002 |
| WO | WO02/069212 A3 | 9/2002 |
| WO | WO2005/043277 A2 | 5/2005 |
| WO | WO2005/043277 A3 | 5/2005 |

OTHER PUBLICATIONS

A Store Card Issuer Looks for Lift From Electronic Gift Certificates, Credit Card News, Feb. 1, 1995, 2 Page.

Armstrong; Fund of Funds: Perfect Solution or Dangerous Shortcut?, Investor Solutions, Inc., www.investorsolutions.com, Printed 7/24/200.

Asch; How the RMA/FAIR ISAAC Credit-Scoring Model was Built, Journal of Commercial Lending, vol. 77, No. 10, Jun. 1995, pp. 10-1.

Associates First Capital Corporation, Hoover's Inc., The Industry Standard: The Newsmagazine of the Internet Economy, Thestandard.net/Companies/Company-Display, 4/06/199.

At Your Request, www.wingspanbank.com, 9/28/199.

Bank; Cash, Check,Charge—What's Next?, Seattle Times, 03/06/199.

Block, Blockbuster Running Test of a Stored Value Card, the American Banker, 09/01/199.

Boatmen's Floats Stored Value Into the Employee Incentive Waters, Debit Card News, vol. 2, Issue 2, Jul. 16, 1996, 3 Page.

Bogle; Mutual Funds at the Millennium: Fund Directors and Fund Myths, The Vanguard Group to the '40 Act Institute of PLI (Practicing Law Institute), New York, NY, May 15, 2000, 15 Page.

Brehl; Banks Issue Cash-Card Pledge, The Toronto Star, Oct. 9, 1997, 1 PAG.

Britt; Competing in Auto Lending, America's Community Banker, vol. 5, No. 11, Nov. 1, 1996, pp. 33-3.

Brown et al.; Purchasing Card Magic: Eli Lilly Finds Accounts Payable Flying High With Plastic, Corporate Cashflow, vol. 15, No. 12, Nov. 1994, 2 Page.

Buchner et al.; Hotdoc: a Flexible Framework for Spatial Composition, Visual Languages, 1997, Proceedings, 1997 IEEE Symposium, Abstract, Sep. 23-26, 1997, pp. 92-99.

Business Times; Electronic Purse Can Free You From ATM DRAG, Business Times, www.btimes.co.za, Printed Feb. 23, 2001, 1 PAG.

Cardex Incentives, www.cardex.com, 04/06/199.

Cardflash, 04/05/200.

Carey; The Sub-Prime Credit Market: Identifying Good Risks for Unsecured Cards, Credit World, vol. 85, No. 1, Sep. 1996, pp. 13-1.

Cesnabanco Introduces Stored Value Card Technology Blockbuster Video is First Merchant Partne.

Chi et al.; Principles for Information Visualization Spreadsheets; Computer Graphics and Applications; IEEE; vol. 18; Issue 4; Abstract, Jul./Aug. 1998, pp. 92-99.

Clark; Microsoft, VISA to Jointly Develop PC Electronic-Shopping Software, The Wall Street Journal, Nov. 9, 1994, WSJ B.
Common Electronic Purse Specifications, Business Requirements, Version 6.0, 12/199.
Consortium Created to Manage Common Electronic Purse Specification, Cardtech Securtech, Chicago, www.visa.com/av/news/prmisc051199.vhtml, 05/11/199.
Coulton; Incentives Field Moving to Card-Based Series 14, American Banker, Mar. 26, 1998, 3 Page.
Credit Scoring New Markets, Bank Technology News, vol. 9, No. 7, Jun. 1996, P.
CSU/DSU (Channel Service Unit/Data Service Unit), CTI (Computer-Telephony Integration), pp. 208-221.
Cumby et al.; Evaluating the Performance of International Mutual Funds, The Journal of Finance, vol. 45, No. 2, Jun. 1990, pp. 497-452.
D.C. Area Safeway Stores Look for Increase in Sales Volume and Revenue With Cards, Card News, vol. 6, No. 25, Dec. 30, 1991, pp. 7.
Davenport et al.; Numbers-A Medium That Counts [Spreadsheet Software]; Computer Graphics and Applications; IEEE; vol. 11; Issue 4; Abstract, Jul. 1991, pp. 39-34.
Derivatives Primer, CEIBA, Association for Financial Professionals, Committee on Investment of Employee Benefit Assets, 12/200.
Dugas; Payroll May Ask: Paper or Plastic?, USA Today, 3B, Aug. 14, 2001, 1 PAG.
Edwards; ATMs The Hot New Media Buy, ABA Banking Journal, Mar. 1999, pp. 58, 6.
Electronic Purse Card to Be Launched Tomorrow, New Straits Times, News Clippings, Sep. 18, 1999, Printed Feb. 23, 2001, 3 Page.
Electronic Purse, SCIA (Smart Card Industry Association), About Smart Cards, www.scia.org, Printed Feb. 23, 2001, 1 PAG.
E-Z Pass, Web Page, http://www.ezpass.com-disc_portnewyork.html, 11/12/200.
E-Z Pass, Web Page, http:\\www.ezpass.com-disc_NY_annual.html, 11/12/200.
E-Z Pass, Web Page, http:\\www.ezpass.com-framemain.html, 11/12/200.
E-Z Pass, Web Page, http:\\www.ezpass.com-whatis.html, 11/12/200.
Fickenscher; AMEX Prepaid Offering is Latest Card for Firms Regarding Employees, American Banker, vol. 161, No. 151, Aug. 8, 1996, pp. 1.
First Data Markets Stored-Value Cards, Cards International, Jan. 30, 1996, P.
First Union Issues Smart Cards to Fort Benning Recruits, Cardfax, vol. 1999, No. 60, Mar. 26, 1999, 1 PAG.
First USA—Activate Today and Get One Hour Free Calling Card Calls, Call 1-800-555-2535, First USA, 6 Page.
First USA—Call 1(800)335-2453 to Receive One Free Hour of Domestic Long Distance Calling (No Strings Attached), First USA, 6 Page.
First USA Platinum Connect, First USA Bank, First USA Promotional Mailing, Oct. 1997, 6 Page.
Freemarkets, Printed on 04/26/199.
Frequently Asked Questions, Ecard, www.eregard.com, printed Sep. 23, 2001, 7 Page.
Friedland; Credit Scoring Digs Deeper Into Data, Credit World, vol. 84, No. 5, May 1996, pp. 19-12.
Gottfried et al.; Graphical Definitions: Making Spreadsheets Visual Through Direct Manipulation and Gestures, Visual Languages, 1997, Proceedings, 1997 IEEE Symposium on, Sep. 23-26, 1997, pp. 246-253, Abstrac.
GS-CALC 6.0.1.1.; JPS Development; http://download.com, Printed 9/03/200.
Guidotti; Comparing Environmental Risks: A Consultative Approach to Setting Priorities at the Community Level, Public Health Rev 1994, vol. 22, Jun. 16, 2005, pp. 321-333.
Hansell; VISA to Unveil Electronic Purse Cards, New York Times, Printed Feb. 23, 2001, 2 Page.
Hedge Fund Primer—the Basics, KSP Capital Management LLC, Information@kspcapital.com, Printed Jul. 24, 2002, 18 Page.
Hedge Fund Primer About Fund of Funds, Links Securities LLC, www.hedgefund.net/prime_fof.php3, 2002, 2 Page.
Here's the Calling Convenience You Asked for: 1-800-Call-Att . . . for All Calls, AT&T, Appendix A: for Card Carriers, 1999, 7 Page.
Hickman; Using Software to Soften Big-Time Competition, Bank Systems and Technology, vol. 31, No. 8, Jun. 1994, pp. 38-34.
Hoovers, General Mills, Inc. Corporate Profile Relied Upon to Show the History of the Company, http:/cobrands.hoovers.com/global/cobrands/proquest/history.xhtml?coid=10639, Jul. 12, 2005, 2 Page.
Hotchkiss; ATM'S at the Head of Their Class, Bank Marketing, vol. 29, No. 3, Mar. 1997, pp. 26-23.
Huddling With William Bernstein: Small Town Doctor, Investing PR.
Incentive Firms Find Debit Cards a Rewarding Experience; Debt Card News; vol. 3, No. Nov. 28, 1997.
Introducing Spendingmoney(TM), Armetta: Marketing & Design Product Concept Report, Oct. 9, 1996, 15 Page.
Introducing the First USA Platinum Connect Card, First USA Promotional Mailing, Dec. 1997, 2 Page.
Jameson; Expanding Risk Management Strategies: Key to Future Survival, Credit World, vol. 84, No. 5, May 1996, pp. 16-11.
Key Bank Holiday Offer, http://www.key.com/Swiftgift/home.html, Printed 04/05/199.
Kneis; Hedge Fund Strategies: A Primer, Canadianhedgewatch, P.
Konrad; IBM Had a Bunch of Unusual Ideas in 2003, www.philly.com, Printed Jan. 21, 2004, Posted on Jan. 13, 2004, 2 Page.
Kutler; Cash Card Creator Looking Beyond Mondex, 02/09/199.
Lacker; Stored Value Cards: Costly Private Substitutions for Government Currency, Economic Quarterly, 1996, Economic Quarterly, V82, N3, P1(25), ISSN: 1069-7225, 17 Page.
Lamond; Credit Card Transactions Real World and Online, Paying by Credit Card-Real World and Online, http://www.virtualschool.edu/mon/electronicproperty/klamond/credit, Printed Jul. 8, 2005, 17 Page.
Langheinrich et al.; Unintrusive Customization Techniques for Web Advertising, Computer Networks, vol. 31, 1999, pp. 1259-1127.
Lzarony; Stuck for a Gift? Give a Prepaid Credit Card, www.bankrate.com, Dec. 21, 1998, 1 PAG.
Machlis et al.; Will Smart Cards Replace ATMS?, Computerworld, Printed Feb. 23, 2001, 3 Page.
Machlis; Have It the Smart Way: Burger King Program Drives Smart-Card Use, Computerworld, Printed Feb. 23, 2001, 1 PAG.
Mailfrontier Survey Finds That Consumers Hold Financial Institutions Accountable for Online Identitiy Theft, www.mailfrontier.com, Palo Alto, CA, 11/200.
Makuch; Managing Consumer Credit Delinquency in the US Economy: A Multi-Billion Dollar Management Science Application, Interfaces, Feb. 1992, pp. 90-10.
Markese; Can You Trust Mutual Fund Rankings?, Consumers' Research Magazine, vol. 76, No. 10, Research Library, Oct. 1993, p. 2.
Mclaughlin; Tapping Web to Search for Right Fund—Fundprofiler Speeds Search, Boston Herald, Boston, MA, Dec. 16, 1999, p. 7.
Meece; Boatman's Prepaid Cards for Worker-Incentive Firm, American Banker, Jul. 2, 1996, p. 1.
Meredith; Internet Bank Moves Closer to Virtual Reality, USA Today, 05/05/199.
Miller; Section E.2.1: Kerberos Authentication and Authorization System, Project Athena, Cambridge, MA, Dec. 21, 1987, 39 Page.
Mobasher et al.; Creating Adaptive Web Sites Through Usage-Based Clustering of URLS, Knowledge and Data Engineering Exchange Workshop, Chicago, IL and Los Alamitos, CA, 1999, pp. 19-12.
More Retailers Turn to Co-Branding, Chain Store Age Executive With Shopping Center Age, Feb. 1, 1995, 3 Page.
Morgan et al.; Categorizing Risks for Risk Ranking, vol. 20, No. 1, Jun. 22, 2005, pp. 49-45.
Neumann; An Enhanced Neural Network Technique for Software Risk Analysis, IEEE Transactions on Software Engineering, vol. 28, No. 9, Sep. 1, 2002, pp. 904-991.
New 1-800-Call-ATT Campaign Promotes One Number For All Calls, AT&T Marketing, News Release, www.att.com/press/0297/970217.csa.htm, Feb. 17, 1997, 2 Page.
Norris; First Data Unit Develops Blockbuster Cash Card, Omaha World Hearld Sunrise Edition, Business Section, Jan. 19, 1996, p. 1.
O'Conner; Maritz Gets Mastercard's Stamp of Approval, Business Travel News, Aug. 19, 1996, 2 Page.

Opportunity Knocks At Scoring's Door, Collection and Credit Risk, vol. 2, No. 4, Apr. 1997, p. 5.

Payment Data, www.paymentdata.com, 03/05/200.

Piskora; Debit Cards Seen Poised for New Markets, American Banker, Credit/Debit/ATMS, Mar. 7, 1995, p. 1.

Portner; There Must Be a Better Way, Mortgage Banking, vol. 53, No. 2, Nov. 1, 1992, pp. 12-12.

Pourmokhtar; A Hedge Fund Primer Version 0.1, www.emf.net/?farzin/hedgefund.html, Printed Jul. 24, 2002, 5 Page.

Primer: Derivatives Instruments, Derivatives Study Center, www.econstrat.org/dscinstruments.htm, printed Jul. 24, 2002, 8 Page.

Product Data Integration Technologies, Inc., Step Integratin Authors, Printed on 04/26/199.

Proton World and Europay to Co-Operate in Creation of New CEPS-Compliant E-Purse Application, Press Release 1999, Waterloo, Belgium, Jun. 28, 1999, 2 Page.

Purse Application for Cross Border Use in Euro, Cordis, Pace 1st 1999-11531 Pace, www.cordis.lu, Printed Feb. 23, 2001, 3 Page.

Quinn; Credit Card Issuers Keeping a Closer Watch on How You Pay Bills, Washington Post, Staying Ahead, Business Section P6, Apr. 25, 1988, 1 PAG.

Roger et al.; A Credit Scoring Model To Evaluate the Credit Worthiness of Credit Card Applicants, Developments in Marketing Science, vol. 5, 198.

Rosen; Cash Just Isn't Flexible Enough: Shops of the Future Will Only Take Cards, Daily Express, Technology Section, Feb. 10, 1995, 1 PAG.

Sanchez-Klein; Electronic Purse Alliance Planned, Computerworld Online News, Jul. 29, 1998, Printed Feb. 23, 2001, 2 Page.

SK100 Smart Card Electronic Purse Balance Reader, SK100 Balance Reader, http://perso.wanadoo.fr, Printed Feb. 23, 2001, 1 PAG.

Smart Card for Loyalty and E-Purse Applications Eclipses Capability of Conventional MAG-Stripe Cards, Press Release, www.1.sib.com, Apr. 21, 1997, Printed Feb. 23, 2001, 3 Page.

Smartaxis: Load Cash on to Your E-Purse Card, Supported Currencies and Schemes, www.smartaxis.co.uk, Printed Feb. 23, 2001, 9 Page.

Snyder et al.; Indentifying Design Requirements Using Analysis Structures, Aerospace and Electronics Conference, 1991, Naecon, 1991, vol. 2, Abstract, May 20-24, 1991, pp. 786-779.

Song; A Card That Asks for ID, Time Magazine, Apr. 12, 2004, 1 PAG.

Souccar; Smart Cards: 1st Union Smart Card Pilot Enlists a Second Army Base, American Banker, Digital Frontiers, vol. 164, No. 61, Mar. 31, 1999, 3 Page.

Spoerri; Visual Tools for Information Retrieval; Visual Languages; 1993; Proceedings; 1993 IEEE Symposium on; pp. 160-168; Abstract.

Spreadsheet Mapper; www.panopticon.com., printed 10/01/200.

Spurgin; Sopininmon! or What's Happening in the Retail Credit Card Environment, Credit World Journal, vol. 85, No. 4, Mar. 1, 1997, pp. 20-22.

Stolte et al.; Polaris: a System for Query, Analysis, and Visualization of Multidimensional Relational Databases; Visualization and Computer Graphics; IEEE Transactions on; vol. 8; Issue 1; Abstract, Jan./Mar. 2002, pp. 52-56.

Stoughton; The Gift of Credit, www.washingtonpost.com/wp-srv/business, 12/14/199.

Stuber; The Electronic Purse: an Overview of Recent Development and Issues, Bank of Canada, Techanical Report No. 74, www.bankofcanada.ca, Jan. 1996, printed Feb. 23, 2001, 2 Page.

Sullivan; Scoring Borrower Risk, Mortage Banking, vol. 55, No. 2, Nov. 1994, pp. 94-99.

Swiftgift; Welcome to Swiftgift, Swiftgift, www.swiftgiftcard.com, Dec. 8, 1998, 10 Page.

Taylor et al.; Card Issuers Turn to Scoring as They Face Increasing Risk, Financial Services Report, vol. 8, No. 15, Jul. 24, 1991, P.

TCS 4.20; Telsys SAS; http://download.com, Printed 9/30/200.

The Campus Card Conundrum, Card Technology, Journal ISSN: 1093-1279, P. 25+, Feb. 1998, pp. 1.

The Electronic Purse Reaches the Car Park, http:\\docs.vircom.net/mobility/parking, Printed Feb. 23, 2001, 2 Page.

The Evolution of a New Consumerism, Chain Store Age, vol. 73, Jun. 1997, pp. 8.

Trading and Capital-Markets Activities Manual, Instrument Profiles: Structured Notes, Federál Reserve System, the Turin Group, www.toerien.com/books/manual/4040.htm, Printed Jul. 24, 2002, 14 Page.

Understanding the Benefits: Smartcity Offers a Number of Important Benefits to Both the Card Issuers and Their Customers, http://www.Icl.com/smartcards/benefits.htm, Printed Feb. 27, 2001, 2 Page.

Universal Card Free Lifetime Membership Extended 3 Months, AT&T Marketing, www.att.com/press/0297/970217.csa.html, Dec. 4, 1990, 2 Page.

Vandenengel; Cards on the Internet: Advertising on a $3 Bill, Industry Intelligence, Feb. 1, 1995, pp. 46-44.

VISA Cash—Where Can I Get It?, www.visa-asia.com/pd/cash/where.html, 02/23/200.

VISA Cash, www.visa-asia.com/pd/cash/main.html, 02/23/200.

VISA First to Launch Electronic Purse Load Via GSM Mobile Phone, www.cellular.co.za, Johannesburg, ZA, Printed Feb. 23, 2001, 4 Page.

VISA International and Sermepa Announce Plans for Cross Border VISA Cash Based on CEPS, www.visa.com/av/news/praaamisc111699.vhtml, 11/16/199.

VISA Releases VISA Cash Electronic Purse Specifications Based on CEPS, www.visa.com/av/news/praamisc042099.vhtml, San Francisco, 04/20/199.

Welcome to Card Express Cardex, Cardex Website Archived by web.archive on Oct. 31, 1996, http://web.archive.org/web/*/http://www.cardex.com, Retrieve Oct. 18, 2003, 7 Page.

Welcome to Card Express, the Cardex Incentive Card, as Disclosed in the Cardex Web Site Archived by web.archive.org on Feb. 7, 1998, http://web.archive.org/web/*/http://www.cardex.com, Retrieve Oct. 18, 2003, 8 Page.

Why a Fund of Funds?, Altegris Investments, www.managedinvestments.com/hedge_fund_of_funds, Printed 07/24/200.

Smart Cards: Seizing Strategic Business Opportunities pp. 2-20 (Catherine A. Allen & William J. Barr eds., 1997).

American Express Incentive Services, Incentive, Sep. 1996 at 126.

Two Chips Can be Better than One, Card Technology, May 2001 at 40.

Valerie Block, First Data Subsidiary Creates Payroll Card for the Bankless, Am. Banker, Mar. 21, 1997 at 10.

Joris Claessens et al, A Tangled World Wide Web of Security Issues, First Monday, May 2002, http://firstmonday.org/htbin/cgiwrap/bin/ojs/index.php/fm/article/view/935/857.

Mahoney, Electronic Payment Systems Jul. 11, 1997.

Stored-value card, http://en.wikipedia.org/wiki/Stroed-value_card (last visited Apr. 16, 2007).

The Choice Award, Incentive, Dec. 1996, pp. 47-48, 50, 56-57, 63.

Exclusively Yours MasterCard From Maritz . . . The Ultimate Incentive (Advertisement), Incentive, Oct. 1995.

D.B. Glossman et al, Citicorp—Company Report, Investext Report No. 1647151, Oct. 12, 1995, at 8.

Kenneth R. Harney, Home Asset Management Accounts Links Mortgages, Equity Lines, Wash. Post, Oct. 5, 2002, at H06.

Jim Hight, Strategies & Tactics: Consulting Services (1997), http://web.archive.org/web/19970124202934/http://www.strategies-tactics.com/services.htm (last visited Nov. 5, 2009).

Michael deCourcy Hinds, Making the Most of Fast-Falling Mortgage Rates, N.Y. Times, Jun. 30, 1985, at 1.

Incentive Gift Card (Advertisement), Incentive, Aug. 1995.

Paper or Plastic? (Advertisement), Incentive, Feb. 1996.

LendingTree Mortgage Application, www.lendingtree.com (last visited Feb. 1, 1999).

Posting of Jazzy Jeff to Credit Card Commentaries: Kmart MasterCard, http://www.cardoffers.com (Feb. 25, 2003).

Judy Quinn, Incentive Cards Explained, Incentive, Dec. 1995 at pp. 52-54, 58-59.

Kenneth Hein, What's the Deal?: The emergence of debit cards has the incentive industry shuffling its priorities, Inventive, Jul. 1998, at 63.

Kmart MasterCard, CardTrak Online, http://www.cardweb.com/cardtrak/news/2000/september/26a.html (Sep. 26, 2000) (last visited Nov. 6, 2009).

Henry Kneis, Hedge Fund Strategies: A Primer, Canadian Hedge Watch, Dec. 15, 2001, at 3 (available at http://www.abriafunds.com/doc_bin/Cad%20Hedge%20Watch%20Article.pdf).

Debit Card Innovation, International Credit Association Consumer Trends, May 1997, at 2.

Debit Cards: Payroll Card Ups Fees, Am. Banker, Oct. 6, 1997, at 18.

NTS TransPay Debit Card Helps Remote and Unbanked Employees Get Funds Quicker, PR Newswire, Mar. 18, 1997.

Maritz Performance Improvement Company (Advertistement), Incentive, Jun. 1996, at 111.

Interoffice Memorandum from Mike Fraser to Meridian Account Executives, Client Administration Dept. and Marketing Services Dept. (Aug. 2, 1989) (on file with assignee).

Nora Wood, Intel: This high-tech company's sales incentive program motivated top performers to become exceptional starts, Incentive, Dec. 1997, at 28.

Nora Wood, The Power of the Card, Incentive, Jul. 1997, at 65.

Summary Appraisal of Real Property located in West Islip, NY by Kenneth M. Rossman (Feb. 15, 2002) (on file with assingee).

Charles Schwab & Co., Inc., Now 7 Ways for a Better Total Return for Your Money, Sep. 1987.

Chris Connolly, Smart Cards: Big Brother's Little Helpers, Privacy Committee of New South Wales, vol. 66, Aug. 1995.

Phillip Storms, Using mortgage credit to achieve client objectives, 9 J. Fin. Plan. 77 (Oct. 1996).

Daniel Fleishman et al, Transit Cooperative Res. Program, TCRP Rep. 32: Multipurpose Transit Payment Media Oct. 20, (1998).

Vincent Alanzo, Three if by Smart Card, Incentive, Sep. 1995, at 12.

Wells Fargo Blazes New Trail for Homeowners, PR Newswire, Oct. 2 , 2002.

Xiaoyan Li, Time-Based Language Models, Proc. 12th Int'l Conf. Info. & Knowledge Mgmt., pp. 469-475 (2003).

Christine R. Hekman, A Financial Model of Foreign Exchange Exposure, 16 J. Int'l Bus. Stud. 83 (Summer 1985).

Open Financial Exchange, Specification 2.0 Tax Extensions v. 1.0, Jun. 30, 2000.

Tax Executives Inst. Wis. Chapter, Wisconsin Department of Revenue Liaison Meeting, the Tax Executive, Mar.-Apr. 1995.

Ulrich Schreiber et al, Measuring the Impact of Taxation on Investment and Financing Decisions, 54 Schmalenbach Bus. Rev. 2 (Jan. 2002).

"Correlate" (def.), Merriam-Webster Collegiate Dictionary 260 (10th ed. 2001).

Compliance: an Exercise in Risk Management, Compliance Action, vol. 1, No. 7 (Apr. 1996), available at http://www.bankersonline.com/cgi-bin/printview/printview.pl.

M. Granger Morgan et al, Categorizing Risks for Risk Ranking, 20 Risk Analysis 49 (2000).

Basel Committee on Banking Supervision, Operational Risk Data Collection Exercise—2002, Jun. 4, 2002.

Tania L. Motschman et al, Corrective and preventive action, 21 Transfusion Sci. 163 (1999).

Pam Ottem et al, RN and LPN accountabilities and responsibilities, Nursing BC (Jun. 2000).

Whitman Richards, Massachusetts Institute of Technology Artificial Intelligence Laboratory, How to Play Twenty Qeustions with Nature and Win, A.I. Memo No. 660 (Dec. 1982).

\* cited by examiner

SYSTEM AND METHOD FOR MULTI-DIMENSIONAL RISK ANALYSIS

CROSS REFERENCE TO RELATED APPLICATIONS

This application claims benefit of U.S. Provisional Application No. 60/600,653 filed Aug. 11, 2004, and is a continuation in part of U.S. application Ser. No. 10/384,721 filed Mar. 11, 2003, which claims benefit of U.S. Provisional Application No. 60/363,641 filed Mar. 11, 2002. The entire disclosures of U.S. Provisional Application No. 60/600,653, U.S. application Ser. No. 10/384,721, and U.S. Provisional Application No. 60/363,641 are incorporated herein by reference.

BACKGROUND OF THE INVENTION

1. Field of the Invention

The present invention generally relates to a method and a system for performing risk management analysis. More particularly, the present invention relates to a system with a scalable architecture for performing risk management analysis and a method of using On-Line Analytical Processing (OLAP) engines to perform multi-dimensional analysis with context-dependent, heterogeneous aggregation functions.

2. Related Art

Large financial institutions typically have a large portfolio of investment positions at any given point in time. Value-at-Risk (VaR) has become the standard manner by which risk associated with the portfolio is measured within these large financial institutions. VaR is used as a quantitative measure of risk for assessment and comparison purposes. VaR was first developed as a measure of market risk to describe the potential loss incurred by unfavorable market conditions.

As used in the present discussion, the term "risk" is defined as the uncertainty of profile or a possibility of losses in a portfolio of financial securities. Risk of a portfolio thus encompasses all possible values of losses (or results of under-performance compared to a benchmark) over a fixed period of time. Risk therefore is mathematically described as a random variable. VaR is a pre-defined quantile, usually 99%, of the probability distribution of this random variable.

The market risk associated with a portfolio can be separated into "continuous market risk," stemming from continuous fluctuations in market prices of instruments in the portfolio, and "event and default risk," which are due to possible abrupt jumps in the instruments' prices caused by events specific to individual issuers (e.g., events affecting actual or perceived creditworthiness or future profitability of the issuers). For debt instruments, possible credit events typically include changes of externally assigned credit ratings or default (insolvency) of the instrument's issuer.

Financial institutions commonly use internal models for portfolio risk analysis. A specific risk add-on for an internal model may be an "event risk" for individual equities and their derivatives. In the case of the broad market, the one-year history of the broad market is by regulatory fiat a sufficient measure of the historical risk of the broad market. Thus the event-risk add-on for equities must be some measure of historical events spanning "a full business cycle," which are idiosyncratic to an individual equity and not captured in a one-year VaR. An equity event is defined as a jump discontinuity in price relative to the broad market, observed during an entire business cycle, which is a larger percent price change than any price changes that were observed over the previous year and thus already incorporated into the VaR estimate.

Generally, a portfolio contains linear and non-linear positions or holdings. For linear holdings (e.g., direct-ownership stock) the VaR of the market risk can be calculated analytically. For non-linear holdings (e.g., options and derivatives) a model incorporating historical daily rate changes typically is applied to the current portfolio, in order to generate a distribution for the value of the portfolio and, therefore, the risk associated with the future of the portfolio.

The output of a risk system is a database that is generated in conformance with the above described models. The database is re-generated at least on a daily basis, and typically is re-generated, at least in part, on an intra-day basis to accommodate intra-day changes in the positions held by financial institutions. The database is queried by the risk managers of a financial institution in order to generate risk reports. Usually, these reports are generated for two purposes: to comply with regulatory requirements; and to manage the risk associated with a portfolio.

Some databases of prior-art risk-management systems are structured in the form of a multi-dimensional cube of cells (nodes). The cells represent various positions contained in a portfolio. In the prior-art risk-management systems (also referred to herein as "risk engines") in which a multi-dimensional model is used, each cell contains only a scalar measure representing one particular measure of a position of the portfolio. For more complex risk engines of the prior art, the cube of cells has no more than ten different dimensions, such as the currency of a position, the market in which the position exists, and so on.

The nature of a multi-dimensional cube is such that that reports may easily be generated that satisfy the needs of a particular user. For example, upper management may require reports that convey executive-level information, e.g., whether a portfolio satisfies federal regulations for capital requirements. Alternatively, reports from the cube may be "drilled down" or presented at a trading-desk level, such that a trader will know exactly the predicted short-term risk associated with a portfolio being traded.

FIG. 1 schematically illustrates a risk engine of the prior art. As previously described, the positions of a portfolio must be evaluated at least on a daily basis, as the market for the investments is ever changing. Element 100 represents datastreams that supply the risk engine with raw data relative to the positions of the portfolio. The raw data to be processed is directed to one of a plurality of valuation-processing systems (pipes) 102, 104, 106, 108 in order to be valued. For example, positions that are comprised of U.S. equities are directed to a valuation processing system (pipe) 102; foreign bonds are processed by a pipe 104; options and derivatives are processed by a pipe 106, and so on. The positions, once valued by the pipes 102, 104, 106, 108, are used to populate the above-described multi-dimensional cube in a database 110.

In the prior-art system of FIG. 1, there essentially is no sharing of data and no sharing of resources. Each pipe 102, 104, 106, 108 has its own set of resources (e.g., processors) and exclusively operate on a particular type of data (e.g., U.S. equities). This architecture, although adequate for financial institutions within a certain size, is unable to keep up with increasing volumes of financial data for growing financial institutions. For example, if there is a merger of two mid-sized financial institutions into one larger institution, the risk engines of either of the institutions would not be able to accommodate the risk-management processing of the other institution. This typically leads to disparate risk engines within the combined (merged) financial institution, with potentially arbitrary assignment of data to be processed by one or the other of the risk engines.

The only way that the risk engines of either financial institution would be able to handle the increased volume would be to purchase more, larger, faster, and increasingly expensive processors and networks. But even this solution has its limits, as the architecture of the above-described prior-art risk engines can only be scaled up so much. One significant problem discovered by the present inventors is that the architecture of prior-art risk engines leads to uneven workload distribution, which in turn leads to unacceptable delays in valuation and reductions in the engines' throughput. The inventors of the present invention performed a benchmarking test of the prior-art risk engines on increasingly bigger machines and networks, and found that there is a clear limit to the extent to which a prior-art risk engine would no longer scale up.

The inventors of the present invention found that the prior-art risk engines are incapable of valuing a portfolio of one million positions for the simultaneous processing of a one-day VaR, ten-day VaR, corporate stress tests, and specific issuer risk processing in a timely manner.

OLAP engines have been used to perform portfolio risk analysis according to conventional techniques. Generally, as mentioned above, financial institutions use internal risk models for such analysis, which is inherently multi-dimensional. As such, OLAP engines provide a natural choice for performing portfolio risk analysis. However, aggregation functions used in most if not all internal risk models are context-dependent and heterogeneous. This significantly limits the ability to use the generic analysis mechanism provided by OLAP engines to perform analyses for specific conditions. That is, commonly used aggregation functions do not allow OLAP engines to be utilized to the fullest extent of their capabilities, because such aggregation functions are context-dependent and heterogeneous, and because the conventional representation of the information to be aggregated cannot be adapted to a generic analysis mechanism. Therefore, OLAP engines utilized to aggregate conventionally represented information are prevented from performing a generic risk analysis that is context-dependent and heterogeneous, and can easily be adapted to generate an analysis using desired parameters.

FIG. 8 shows an example of a data hierarchy with a tree structure, in which C0 represents a node. C1, C2, and C3 are intermediate nodes extending from C0, and C11 through C32 are leaves extending from C1, C2, or C3.

Instead of a tree structure, a data hierarchy may be represented by a cube of one or more dimensions. FIG. 9 shows a data hierarchy represented as a two-dimensional (2D) cube, in which the horizontal axis represents "Region" and the vertical axis represents "Currency." For the multi-dimensional cube of FIG. 9, if an aggregation function f( . . . ) is a addition operation, which clearly is context-independent and homogeneous, then:

$C1=f(C11, C13)$ $C2=f(C21, C22)$ $C3=f(C31, C33)$ $C4=f(C42, C43)$.

That is, in the 2D (Currency, Region) cube of FIG. 9, the node C0 represents the total for the Currency and Region dimensions. The intermediate node C1 represents the total for the region "NA" or North America, which has a leaf C11 corresponding to the Japanese yen (JPY) and a leaf C13 corresponding to the American dollar (USD). The intermediate node C2 represents the total for the region "EMEA" or Europe/Middle East/Africa, which has a leaf C21 corresponding to the Japanese yen and a leaf C22 corresponding to the British pound (GBP). The intermediate node C3 represents the total for the region "ASIA" or Asia, which has a leaf C31 corresponding to the Japanese yen and a leaf C33 corresponding to the American dollar. The intermediate node C4 represents the total for the region "LA" or Latin America, which has a leaf C42 corresponding to the British pound and a leaf C43 corresponding to the American dollar.

In risk management, however, most aggregation functions are context-dependent, as mentioned above. The following is an example of a context-dependent aggregation commonly performed in market and credit management.

Table 1 shows a portfolio of positions. The positions in Table 1 may be represented as a three-dimensional (3D) cube, with the dimensions "Legal Entity," "Currency," and "Issuer," as schematically shown at reference numeral 100 in FIG. 10. At the vertices of the cube 100 are cells 110, each of which contain measures for the three dimensions of the cube 100. In the case of Table 1, each cell of the cube contains the measures "MTM" (market-to-market) and "Exposure." That is, each cell corresponding to Table 1 has three dimensions (i.e., the three dimensions of the cube 100) and two measures.

TABLE 1

PORTFOLIO OF POSITIONS

| Legal Entity | Currency | Issuer | MTM | Exposure |
|---|---|---|---|---|
| FSA | GBP | IBM | 100 | 10 |
| FRB | USD | GM | −200 | −20 |
| FSA | USD | GM | 450 | 30 |
| FRB | GBP | GM | 300 | 20 |
| FRB | GBP | GM | −300 | −20 |
| FSA | USD | IBM | −500 | −80 |
| FSA | JPY | IBM | 450 | 30 |
| FRB | JPY | GM | 600 | −50 |
| FSA | USD | GE | 250 | 20 |
| FSA | GBP | GE | −300 | −10 |
| FRB | USD | GM | 150 | 10 |

One of ordinary skill in the art will appreciate that although the cube 100 shown in FIG. 10 has three dimensions, the term "cube" as discussed herein is not limited to a 3D cube but instead may have more or fewer dimensions than three. Similarly, although each cell 110 in FIG. 10 is described as having three dimensions, the term "cell" as discussed herein may have more or fewer than three dimensions. Also, note that the dimension Legal Entity may be represented as a data hierarchy with a tree structure, as schematically shown in FIG. 11.

In the present example, the aggregation rules are as follows:

MTMs are netted at any level; and

Exposures are netter for an Issuer and grossed between Issuers.

For a query to calculate MTM and Exposure by Legal Entity, aggregation according to the above aggregation rules returns the results shown in Table 2.

TABLE 2

RESULTS OF LEGAL-ENTITY QUERY

| Legal Entity | MTM | Exposure |
|---|---|---|
| FRB | 550 | 60 |
| FSA | 450 | 80 |

The results shown in Table 2, are obtained according to the following operations.

First, the 3D cube containing the data of Table 1 is projected onto two dimensions, Legal Entity and Issuer, by algebraically summing the MTM and Exposure measures for each cell. That is, the 3D cube is projected onto a 2D cube. The results of this summing operation are given in Table 3.

TABLE 3

SUMMATION RESULTS

| Legal Entity | Issuer | MTM | Exposure |
|---|---|---|---|
| FRB | GM | −200 | −20 |
| FRB | GM | 300 | 20 |
| FRB | GM | −300 | −20 |
| FRB | GM | 600 | −50 |
| FRB | GM | 150 | 10 |
| FSA | GE | 250 | 20 |
| FSA | GE | −300 | −10 |
| FSA | GM | 450 | 30 |
| FSA | IBM | 100 | 10 |
| FSA | IBM | −500 | −80 |
| FSA | IBM | 450 | 30 |

Next, netting by issuers is performed by consolidating the cells. That is, for each issuer, the MTM and the Exposure is algebraically added. Results of this netting operation are given in Table 4.

TABLE 4

RESULTS OF NETTING

| Legal Entity | Issuer | MTM | Exposure |
|---|---|---|---|
| FRB | GM | 550 | −60 |
| FSA | GE | −50 | 10 |
| FSA | GM | 450 | 30 |
| FSA | IBM | 50 | −40 |

Finally, data from the 2D cube is projected onto one dimension, Legal Entity, by netting the MTMs and "grossing" or calculating the gross values for the Exposures. That is, the MTMs are summed algebraically and the absolute values of the Exposures are summed algebraically. The results of this projection are given in Table 5, which is the same as Table 2.

TABLE 5

RESULTS OF PROJECTION

| Legal Entity | MTM | Exposure |
|---|---|---|
| FRB | 550 | 60 |
| FSA | 450 | 80 |

The above example illustrates the conventional operations used to project a 3D cube onto a 1D cube (with the single dimension of Legal Entity, in the example). At this point, if it is desirable to further aggregate the 1D cube according to the data hierarchy of FIG. 11, an operation equivalent to summing the rows of Table 5 is performed. (A straight algebraic summation operation would yield erroneous results, because the 2D-to-1D projection resulted in the loss of information.) However, because such an aggregation is non-linear, it is necessary to go back to Table 4 and perform a netting operation by issuer. The results of this netting operation are given in Table 6.

TABLE 6

RESULTS OF NETTING BY ISSUER

| Issuer | MTM | Exposure |
|---|---|---|
| GM | 1000 | −30 |
| GE | −50 | 10 |
| IBM | 50 | −40 |

From the results in Table 6, a netting operation is performed on the MTM data, and a grossing operation is performed on the Exposure data to arrive at the final "Corp" aggregation results, which are given in Table 7.

TABLE 7

RESULTS FOR CORP

| Corp | MTM = 1000 | Exposure = 80 |
|---|---|---|

The results in Table 7 would not have been obtained by performing netting and grossing operations on the data in Table 5, which would have given the erroneous results of MTM=1000 and Exposure=140.

Similarly, for a query to calculate MTM and Exposure by Currency, aggregation according to the above aggregation rules returns the results shown in Table 8.

TABLE 8

RESULTS OF CURRENCY QUERY

| Currency | MTM | Exposure |
|---|---|---|
| GBP | −200 | 20 |
| JPY | 1050 | 80 |
| USD | 150 | 120 |

For a query to calculate the MTM and Exposure for the entire portfolio, simple netting and grossing operations on the data in Table 8 would produce the erroneous results of MTM=1000 and Exposure=220. Instead, the corrects results are given in Table 9, which is the same as Table 7, and are obtained by going back to the 2D (Currency, Issuer) cube and performing a netting operation by issuer, analogous to the operation resulting in Table 6. Then, a netting operation is performed on the MTMs, and a grossing operation is performed on the Exposures.

TABLE 9

RESULTS FOR PORTFOLIO

| Portfolio | MTM = 1000 | Exposure = 80 |
|---|---|---|

As can been seen from the above examples, risk analysis using conventional multi-dimensional cubes cannot be reliably employed in a generic manner to produce results for queries involving context-dependent and heterogeneous aggregation functions. This is because, as dimensions of a cube are projected onto cubes of fewer and fewer dimensions, information is consolidated in the various operations performed for the projections and the original information is no longer preserved.

Referring to FIG. 8, aggregation up the data hierarchy for a context-dependent, homogeneous function is given by:

$$C1=g(C11, C12)$$

$$C2=g(C21, C22)$$

$$C3=g(C31, C32)$$

$$C0=g(C11, C12, C21, C22, C31, C32).$$

where g( . . . ) represents an aggregation function that is context-dependent and homogeneous. Note that g( . . . ) is the same aggregation function regardless of what node(s) it is operating on. However, for a heterogeneous aggregation function, $\mu_j$, all leaf nodes $C_{jk}$ are separated into homogeneous sets, and $$C0=\mu_0(\mu_1(\{C1\}), \mu_2(\{C2\}), \mu_3(\{C3\}), \ldots \mu_k(\{Ck\})).$$

That is, the aggregation function $\mu_j$ is not the same for all nodes, and each aggregation function $\mu_j$ depends on the node that it is operating on as well as neighboring nodes, and also depends on where (what level or part of the data hierarchy) an aggregation is being performed. In this way, context is provided to an aggregation.

The above examples show that, with conventional models or algorithms for queries of information, a query may not contain a dimension that provides context for an aggregation, and also may not provide context for separating nodes into homogeneous sets (e.g., the Issuer dimension in the above examples).

More specifically, the above examples show that, in the conventional uses of OLAP engines, if a second query is to be performed on original information from a first query, the second query must perform new operations on the original information and cannot use operations performed in the first query of the original information. This is due to the way the original information is represented in the conventional models. In other words, the route that is taken along a path of projections for a query determines the information represented by the lower-dimension cubes resulting from the projections, and the original information is irreversibly transformed.

As mentioned above, in the case of financial institutions, advances in market and credit-risk management has led to an increase in the use of internal risk models or algorithms for portfolio risk analysis. This type of risk analysis is inherently multi-dimensional, and OLAP engines are a natural choice for providing the analysis because OLAP engines provide a generic analysis of multi-dimensional data. However, aggregation functions used in most, if not all, conventional internal risk models are context-dependent and heterogeneous. This severely limits the applicability of the generic analysis provided by OLAP engines.

Conventional ways to solve this problem, i.e., to perform the different operations discussed above for the different queries, is to provide customized reports for certain types of aggregations. In other words, for the same set of original information, reports requiring different aggregation operations to be performed are run independently of each other. Such a solution is highly inefficient in terms of time and worker-hours. Clearly, there is a need in the art of data manipulation and processing in the field or risk management, especially manipulation and processing of financial data, for a context-independent and homogeneous method of representing multi-dimensional data, so that OLAP engines may be efficiently used to perform generic analyses.

SUMMARY OF INVENTION

The present invention provides a risk-management system and a data-analysis method for performing high-volume, large-scale risk analysis using a multi-dimensional risk representation. The present invention is applicable to financial analysis, engineering/scientific analysis, as well as other fields in which large numbers of multi-dimensional data are operated on in an analysis or query, and in which the risk representation allows the same multi-dimensional data to be operated in different analyses or queries in a generic manner.

According to an embodiment of the present invention, a database of the risk management system of the present invention preferably contains more than ten dimensions (e.g., 32) which make the database much more flexible than prior-art databases. The multi-dimensional risk representation of the present system is a cube having elements that need not be strictly numbers but instead may be objects that are used to generate different VaR vectors. For example, one such object may be a number of positions (e.g., 256) for a ten-day holding period, a one-day holding period, or any reasonable period specified by a user. Each cube is associated with cell whose entries are distributions of multiple random variables. The system is implemented as a set of collaborating sub-components, which uses partitioning, and pipeline parallelism, and which is heavily multi-threaded. Additionally, the system employs two basic types of elements in its architecture: controllers and brokers.

The controllers of the present invention are engines that perform actual processing of data. Preferably, the controllers have three main components: an input queue, a manager, and workers. Each controller retrieves units of work from the incoming queue, processes the units, and places results into an outgoing queue. The outgoing queue of a controller is shared with a next element in a processing chain.

The brokers of the present invention manage access to and from resources. That is, the brokers are responsible for maintaining a pool of common resources and providing access to those resources to a requestor (e.g., a controller). Preferably, the resources include a data source, such as a database containing market pricing data, for example. A broker accesses a data source though an adapter. Additionally, the brokers maintain a cache of cacheable elements.

Utilizing controllers and brokers as described above, the risk management system of the present invention functions as a risk engine that is scalable to virtually any size. As a processing load of the risk engine increases, additional workers may be added to increase its processing power.

According to another embodiment of the present invention, the data analysis method uses a multi-dimensional risk representation that allows a standard OLAP engine to perform analysis on multi-dimensional data, in which the analysis includes context-dependent, heterogeneous aggregation functions. The multi-dimensional data is represented as a multi-dimensional cube, which consists of dimensions and cells. Each cell includes a set of coordinates and either a scalar measure, a set of scalar and vector measures, or an object that implements calculation models. The set of coordinates contains all dimensions defined in the cube, and no more.

According to yet another embodiment of the present invention, multi-dimensional data is represented as a multi-layered multi-dimensional cube (referred to herein as an "outer" cube), which consists of dimensions and cells. Each cell includes a set of coordinates, an inner multi-dimensional cube (referred to herein as an "inner" cube), and may contain a set of scalar and vector measures. Dimensions of the inner cube include all dimensions required for aggregations. Dimensions of the outer cube include only dimensions needed for context (or reporting). The dimensions of the outer cube need not be the same as the dimensions of the inner cube. Each cell of the inner cube contains another cube (sub-inner multi-dimensional cube) or a set of scalar and vector measures. That is, the term "multi-layered" derives from the cube within a cube within a cube, etc., structure. The outer cube may have one or more inner-cube layers. Aggregation is performed on the set of measures of the inner cube based on a context for the aggregation provided by the outer cube.

According to the present invention, for the first example discussed above, the multi-dimensional data is represented as a 2D outer cube having the dimensions Legal Entity and Currency and a 1D inner cube having the dimension Issuer. The cells of the inner cube contain two measures: MTM and Exposure.

According to a further embodiment of the present invention, a programmable computer for use in performing risk analyses is provided. The programmable computer includes at least one memory including at least one region for storing computer-executable program code, and a processor for executing the program code stored in the memory. The program code implements a risk-analysis method using multi-layered multi-dimensional cubes to represent positions in a portfolio of an institution.

According to still another embodiment of the present invention, computer-executable code stored on a computer-readable medium is provided. The code operates to implements a risk-analysis method using multi-layered multi-dimensional cubes to represent positions in a portfolio of an institution.

BRIEF DESCRIPTION OF THE DRAWINGS

The present invention will be more readily understood from the detailed description of the invention presented below considered in conjunction with the attached drawings, of which.

Figure 1:
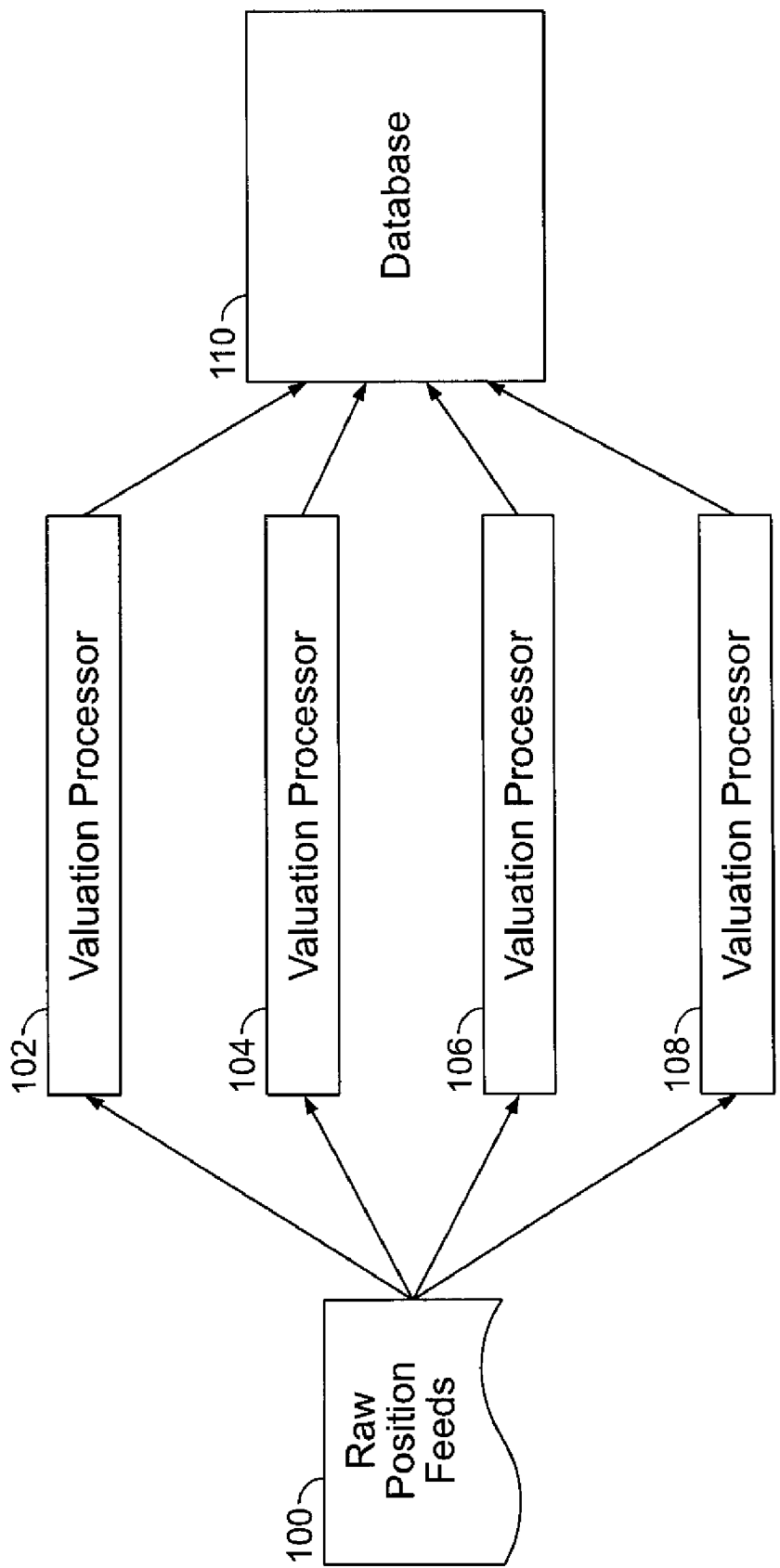
FIG. 1 schematically illustrates a prior-art system for performing risk valuation.

It is to be understood that the attached drawings are intended to illustrate aspects of the present invention, but the present invention is not limited to the precise forms shown in the drawings.

DETAILED DESCRIPTION OF THE INVENTION

Figure 2:
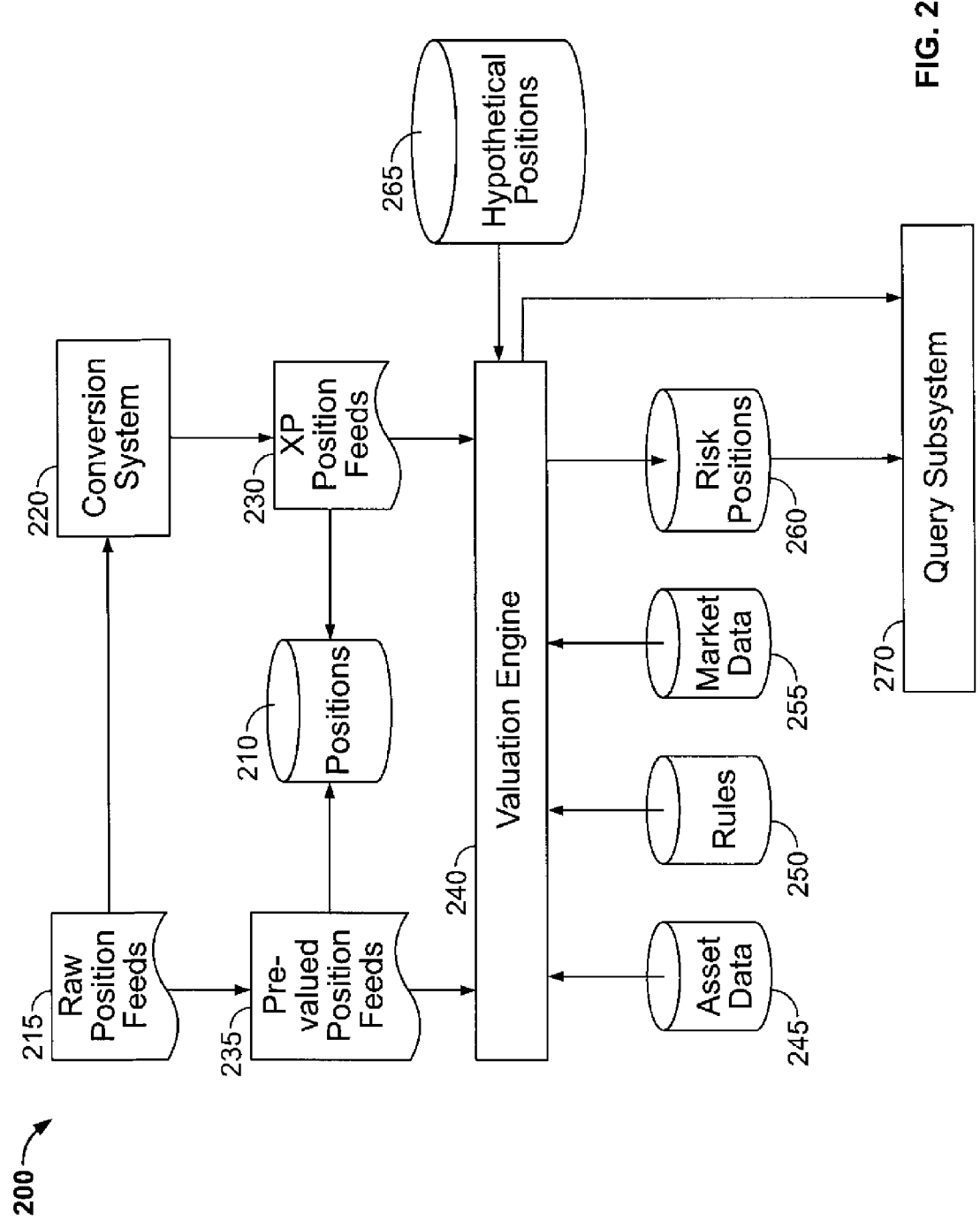
FIG. 2 schematically depicts a risk-management system according to an embodiment of the present invention.

FIG. 2 schematically illustrates a risk management system 200 according to an embodiment of the present invention. The system 200 is able to process at least 2,000,000 risk positions on a daily basis and is scalable to accommodate volume increases in excess of three-million positions. In a preferred embodiment, the system 200 is hosted on a SUN® F15K server.

The system 200 is able to run simultaneous calculations based on various methodologies. This means that the system 200 allows risk managers to value, within the same run, positions according to historical simulation methodology with a one-day holding period and a ten-day holding period using absolute and proportional shift types, for VaR, market stress, and specific-issuer risk. Additionally, the system 200 provides improved transparency, meaning that users (e.g., risk managers) are able to see what prices and shock factors were used for a valuation of any particular position.

As further described below, the system 200 is able to accommodate not only overnight position feeds, but also intra-day feeds and hypothetical positions. The system 200 provides a foundation for valuing hypothetical positions using real prices, real positions using hypothetical prices, and hypothetical positions using hypothetical prices. The system 200 also enables a risk manager to create a portfolio that includes both real and hypothetical positions in order to evaluate how additional trades, a change in price(s), and/or a change in shock factors may affect a risk profile of the portfolio.

The system 200 includes a positions database 210, which contains position data representing, for example, positions for a portfolio of a financial institution. The portfolio typically includes a large number of positions (e.g., several hundred thousand). Each position contains at least: identification information; booking-related information; non-statistical measures, such as quantity and net open position; asset related information such as product type, CUSIP or ticker, and credit rating; and issuer-related information such as ISIN and name, type. Instruments representing different positions may be associated with the same issuer.

Typically, a portfolio of an entire financial institution is divided into subportfolios. Preferably, the subportfolios are organized that each subportfolio contains only positions that share a common issuer or are traded by the same desk, for example.

Raw position feeds 215 with changes in the financial institution's positions are processed on at least a daily basis. Typically, a bulk portion of the raw position feeds 215 is inputted to the system 200 during the night, as various systems supporting various divisions of the financial institution report changes in the financial institution's positions that occurred during the day (e.g., sold 10,000 shares of XYZ stock and bought $1,000,000 worth of bonds issued by company ABC). Furthermore, as positions change throughout the day, it may be desirable or even necessary to update the position data in the positions database 210 to reflect these changes. Intraday updates generally are expected if the system 200 is operated in the United States as foreign subsidiaries of the financial institution report their trading activities throughout the day.

As further described below, because the data in the raw position feeds 215 originates from a variety of different sources, the data must be converted into a common format before the position data in the positions database 210 can be updated. This conversion is performed by a conversion system 220. The system 200 functions to value a position itself or to process positions that have been valued externally according to scenarios specified by the system 200. Positions that are to be valued internally by the system 200 are inputted to the system 200 as Extended Position Format (XP) files. The positions are converted by the conversion system 220 and fed into the positions database 210 as XP position feeds 230. Positions that have been valued externally (although in accordance with scenarios specified by the system 200) arrive at the system 200 as prevalued position feeds 235. Each of the XP position feeds 230 and the prevalued position feeds 235 perform an enhancement function, such as filling in missing data, cleaning data, formatting and resolving conflicting data, etc.

The system 200 includes a valuation/risk engine 240. Although shown in FIG. 2 as a single engine, the valuation/risk engine 240, as further described in greater detail below, may be comprised of several engines, calculators, adapters, information brokers and other processing components. One of the important functions of the valuation/risk engine 240 is to calculate hypothetical market values. The valuation/risk engine 240 is implemented as a set of collaborating subcomponents, which use partitioning, and pipeline parallelism, and which is heavily multi-threaded. As discussed above, the valuation/risk engine 240 preferably is implemented on an enterprise-class MPP server (such as an F15K server). The partition and pipeline parallelism of the subcomponents makes the most efficient use the power of this server.

The valuation/risk engine 240 performs valuation processing, including valuing positions from the raw position feeds 215 and saving the valued positions in the positions database 210 for subsequent retrieval, analysis, and querying. More specifically, the valuation processing includes: retrieving positions from the raw position feeds 215; obtaining a proper calculator for a position depending on an instrument of the position; and retrieving necessary prices, performing valuation, and storing data corresponding to the valued positions in the positions database 210 for subsequent retrieval.

The positions database 210 contains position data as inputted via the raw position feeds 215. As described above, some of the position data correspond to positions that are prevalued (inputted through the prevalued position feeds 235) and some of the position data correspond to positions that are not valued (inputted through the XP position feeds 230). A risk position database 260 stores valuation and classification results for each position. This database 260 is a physical storage unit for a compressed, virtual multi-dimensional cube, typically stored in the form of an interrelated set of tables.

Coupled to the valuation/risk engine 240 are several databases that are employed in valuation and risk determination processes performed by the system 200. An asset-data database 245 stores data related to assets represented in positions such as those corresponding to the position data in the positions database 210. For example, for equities, an asset may be identified by its industry-standard codes, such as ISIN (International Securities Identification Number) or CUSIP (Committee on Uniform Securities Identification Procedures). The asset-data database 245 stores static information about an asset, such as a coupon rate for a fixed-coupon bond, a reset schedule for a floating-coupon bond, expiration and strike data for an option, fixed-coupon information, spread data, and so on.

A rules database 250 stores various rules that govern processing of data by the valuation/risk engine 240. In a preferred embodiment, the rules stored in the rules database 250 are business rules stored in metadata format. The rules database 250 includes rules that, for each position, determine what valuation model to use and how to map input parameters of a model to attributes of a position. As further described below, the rules database 250 includes descriptions of libraries in the system 200 that are required to value each position.

A market-data database 260 stores market data related to the assets represented in the positions, such as the price of a stock, for example. Typically, market data is obtained from commercially available, real-time data streams of exchange market data, such as Bloomberg™ and Reuters™. Unlike the asset-data database 245, which stores static data about assets, the market-data database 255 stores dynamic information about assets, such as prices, durations, deltas, gammas, vegas, rates, yields, etc.

As further described below, the system includes a risk-position database 260, which stores calculated risk positions. As previously discussed, the preferred form of a risk positions is a multi-dimensional cube of cells (nodes). The risk-position database 260 is a compressed form of this cube, which is subsequently expanded by a query subsystem 270 when users perform actual queries of the system 200. A hypothetical-positions database 265 of the system 200 stores hypothetical positions that users wish to test. For example, a hypothetical position to be tested may relate to what would happen to a risk position if 10,000 shares of XYZ stock are sold from a portfolio.

The query subsystem 270 is coupled to the risk-position database 260. The query subsystem 270 is employed by various users (risk managers, traders, etc.) within the financial institution to access risk positions in a comprehensible and meaningful manner. Although illustrated in FIG. 2 as a database, the hypothetical positions "database" 265 optionally may be configured as an interface that accepts hypothetical positions that need not be stored in a formal database, e.g., real-time generated hypothetical positions.

Figure 3:
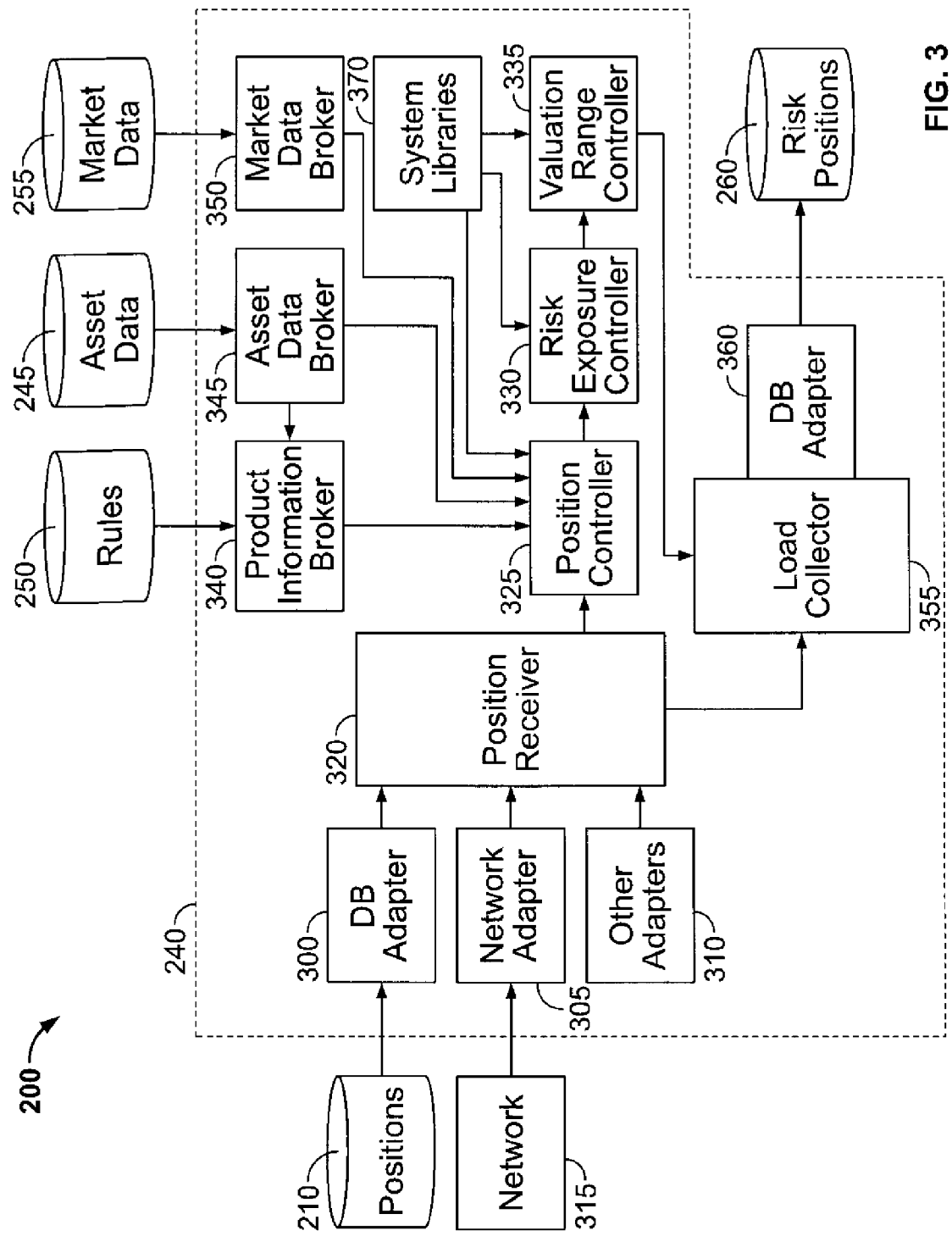
FIG. 3 schematically illustrates a risk engine according to an embodiment of the present invention.

FIG. 3 schematically illustrates the valuation/risk engine 240 according to an embodiment of the present invention. The valuation/risk engine 240 includes three or more input adapters, each of which are media-stream adapters: a database stream adapter 300; a file stream or network adapter 305; and at least one other adapter 310. The other adapter 310 may be an MQ Series stream adapter for interfacing with popular messaging MQ Series servers from IBM® Corporation or a Web-services adapter.

The database stream adapter 300 is coupled to the positions database 210. The network adapter 305 is coupled to a network 315. The other adapter(s) 310 is/are coupled to other position-data sources, such as the MQ series device described above. Each of the three media stream adapters 300, 305, 310 preferably functions to read at least the following formats: FIX messages; XML messages; and EDI messages.

"FIX" denotes a Financial Information eXchange protocol, which is a vendor-neutral standardized message format for describing real-time security transactions. FIX is a public-domain specification owned and maintained by FIX Protocol, Ltd. This protocol supports the following electronic conversations between brokers and other financial institutions: equity-order submissions, cancellations and replacements; equity-execution reporting; equity-order statusing; equity-trade allocation; indication-of-interest communications; completed-trade advertisements; and directed e-mail and news messages.

"XML" denotes eXtensible Markup Language, which is a specification designed especially for Web documents. XML allows for customized tags that enable the definition, transmission, validation, and interpretation of data between applications and between organizations.

"EDI" is an acronym for Electronic Data Interchange, which is a common standard for the transfer of data between different companies using networks, such as the Internet. As more and more companies connect to the Internet, EDI is becoming increasingly important as an easy mechanism for companies to buy, sell, and trade information. ANSI has approved a set of EDI standards known as the X12 standards.

The function of each of the adapters 300, 305, 310 is to control an input stream from a source to which a respective adapter is attached. For example, the database stream adapter 300 is coupled to the positions database 210, while the network adapter 305 is coupled to the network 315. Each adapter 300, 305, 310 efficiently retrieves an incoming message, constructs a message object, and place the message object in an outgoing queue that is shared between the adapter 300, 305, 310 and a position receiver 320, which is the next element in the processing chain of the valuation/risk engine 240.

Controllers and brokers are other types of structures basic to the architecture of the system 200. As mentioned above, controllers are engines that perform actual processing of data, and brokers manage access to and from data resources.

Figure 4:
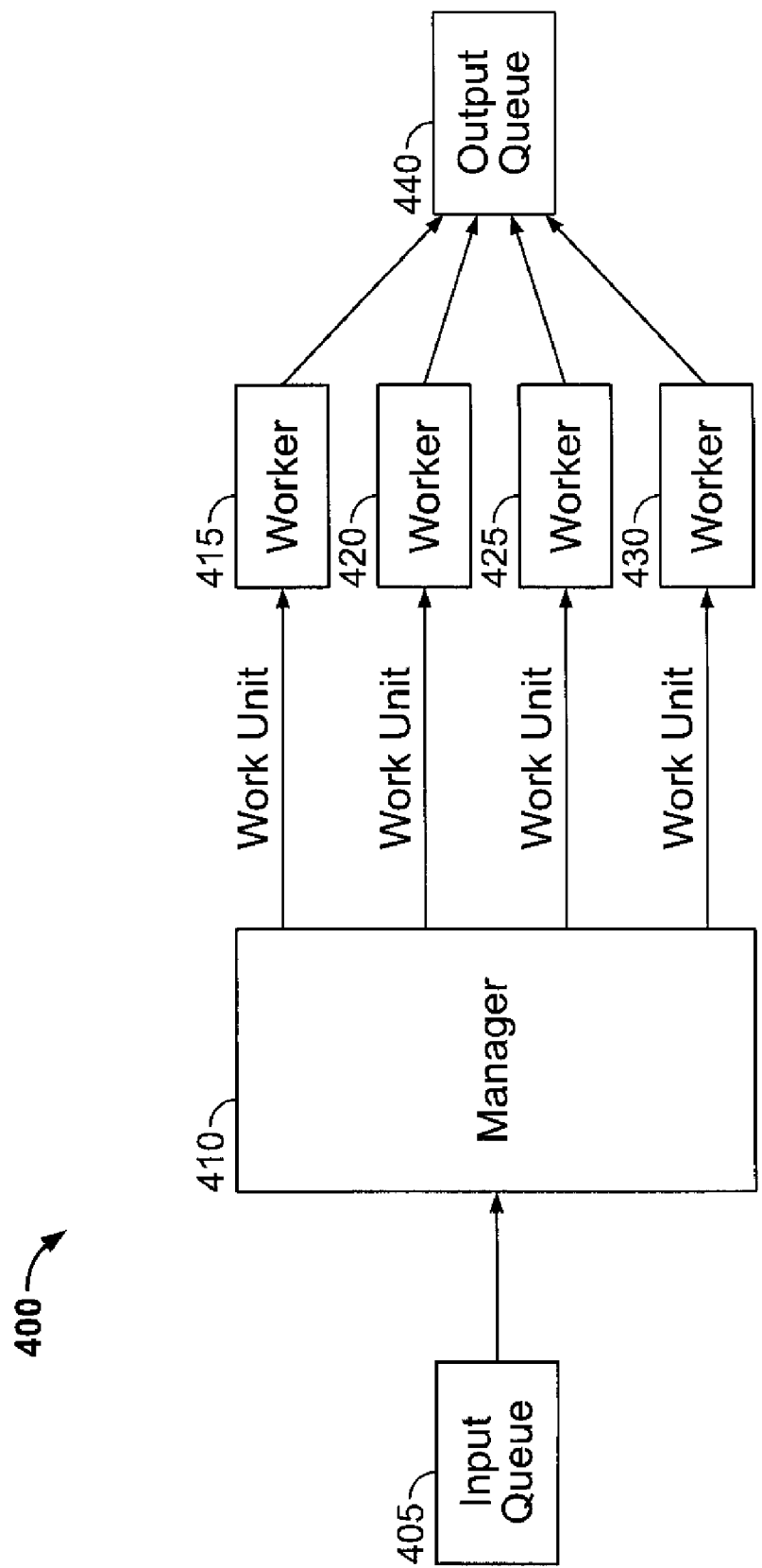
FIG. 4 schematically illustrates a controller arrangement (pattern) according to an embodiment of the present invention.

An arrangement or pattern of a typical controller 400 is schematically illustrated in FIG. 4. A pattern is a generic solution to a common problem. In an object-oriented system, a pattern is realized as group of classes that serve as a foundation for specific customization.

As shown in FIG. 4, the controller 400 has four main components, an input queue 405, a manager 410, workers 415, 420, 425, 430 and an output queue 440. The controller 400 functions to retrieve a unit of work from the input queue 405, process the unit, and place a processing result into the outgoing queue 440. In a typical configuration, the output queue 440 is shared between the controller 400 and the next element in the processing chain. That is, the output queue 440 of a first controller 400 is the input queue 405 of the next controller 400 in the processing chain. A particular unit of work is processed by one of the workers 415, 420, 425, 430 in the context of separate threads. Each worker 415, 420, 425, 430 executes on its own thread and has its own resources.

One of the advantages of the architecture of the controller 400 (and in turn the system 200) is that the number of workers 415, 420, 425, 430 available to any given controller 400 is a turnable (adjustable) parameter that is auto-configurable and has an adjustable fan-out factor. The controller 400 schematically illustrated in FIG. 4 is shown as having a pool of four workers 415, 420, 425, 430. However, in a preferred embodiment, the controller 400 may be configured to have forty or more workers 415, 420, 425, 430.

In operation, when the controller 400 retrieves a unit of work from the input queue 405, the controller 400 selects a free worker 415, 420, 425, 430 and assigns the unit of work to the selected worker 415, 420, 425, 430. If more workers 415, 420, 425, 430 are required to perform the work units being processed by the controller 400, then more workers are configured for the controller 400. Each controller 400 contains configurable parameters with respect to workers: a minimum number of workers and a maximum number of workers. Preferably, a controller 400 never has fewer than the configured minimum number of workers, even if its input queue 405 is empty. Further, a controller 400 preferably never has more workers than the configured maximum number of workers, even if its input queue 405 is full. If the current number of workers is less than maximum number of workers, and there are elements (i.e., units of work) in its input queue 405 that are ready for processing, a controller 400 automatically creates another instance of a worker 415, 420, 425, 430 (i.e., a new worker) and assigns an element to the new worker 415, 420, 425, 430. The configurable parameters, i.e., the minimum and maximum number of workers for a controller 400, are specified in a configuration file for the system 200.

Figure 5:
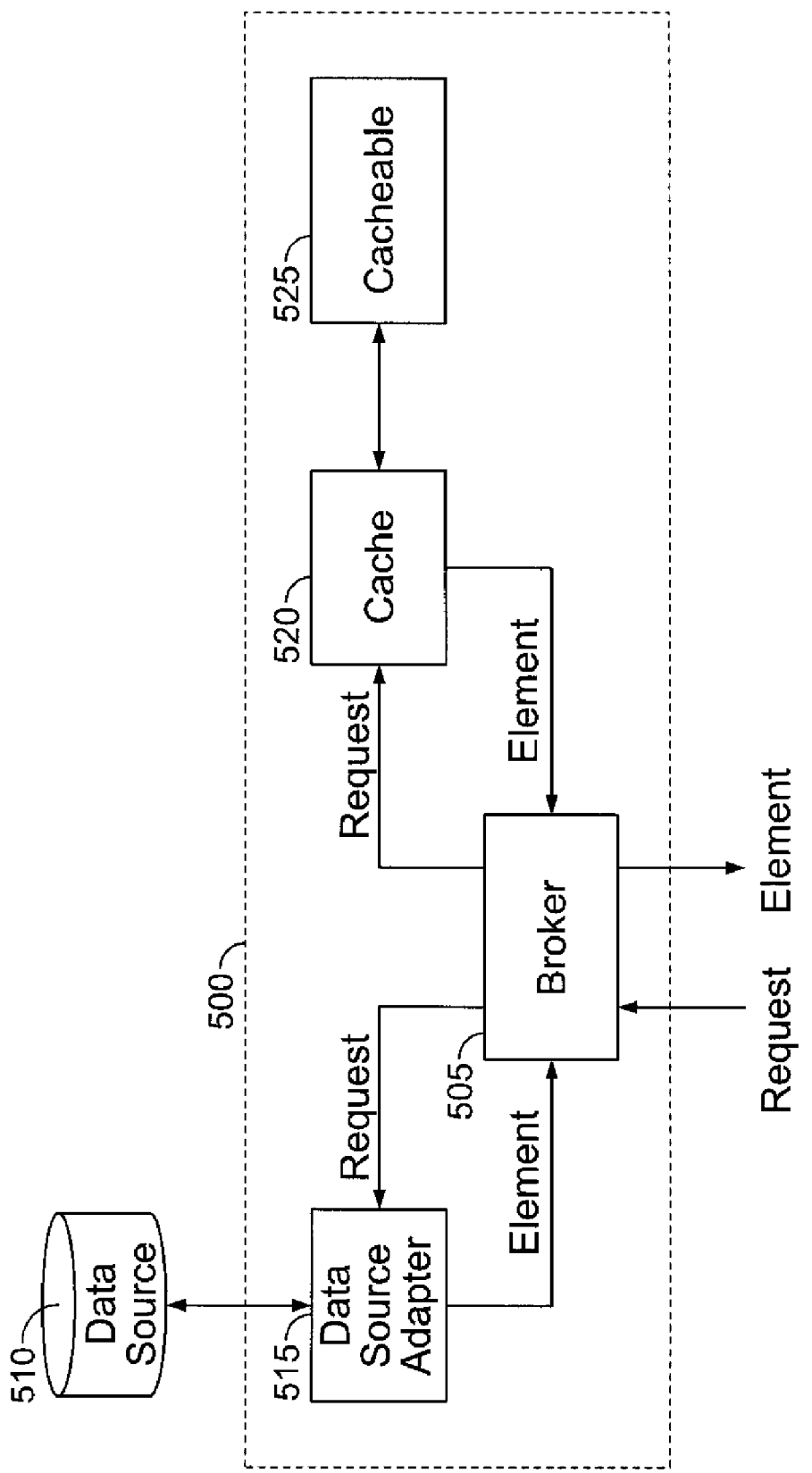
FIG. 5 schematically depicts a broker arrangement (pattern) according to an embodiment of the present invention.

A broker arrangement or pattern 500 is schematically illustrated in FIG. 5. A broker 505 is responsible for maintaining a pool of common resources and providing access to those resources to a requestor. In a preferred embodiment, the resources include a data source 510, such as the market-data database 255 shown in FIG. 3. The broker 505 accesses the data source 510 through an adapter 515.

In addition to accessing data from the data source 510, the broker 505 maintains a cache 520 of cacheable elements 525. In operation, a controller 400 (see FIG. 4) makes a request for an element or data to a broker 505. Upon receiving this request, the broker 505 tries to find the requested element in the cache 520. If the broker 505 cannot find the requested element in the cache 520, the broker 505 creates a new element and tries to populate the new element. Sometimes, the attempted population of the new element does not work, e.g., if the requested element does not exist in the cache 520 or the in the data source 510 itself. If the population attempt is not successful, the existence of an empty element created by the broker 505 will prevent any further attempts to populate the empty element, thus saving computing time.

A broker 505 in accordance with the present invention supports three search policies: optimistic, pessimistic, and very pessimistic, depending on the nature of elements in the cache 520. An optimistic search policy is used when there is a high probability that a desired (requested) element is going to be found in the cache 520. According to the optimistic search policy, a search is first conducted on the open cache 520. If the element is not found in the cache 520, the cache 520 is locked down and the search is conducted again (because some other process might have created the element while the first search was going on). If the element is not found again, a new element is created and the cache 520 is unlocked.

A pessimistic search policy is used when there is a low probability of finding a requested element. According to the pessimistic search policy, the cache 520 is locked down before a search is conducted. A very pessimistic search policy is used when there is a virtually nonexistent probability of finding a requested element. According to the very pessimistic search policy, the cache 520 is locked down and then an empty element is created without searching for the element either in the cache 520 or the data source 510.

The optimistic search policy provides the best throughput and concurrency when elements are mostly in the cache 520. Conversely, when an optimistic search policy is used, it is very costly when elements are not stored in the cache 520.

Returning to FIG. 3, with the arrangements of a controller 400 and a broker 500 in mind, the following is a description of how controllers 400 and brokers 500 are employed in the system 200.

The function of the position receiver 320 is to act as an interface between various controllers of the system 200 and a input stream of data that requires valuation. The position receiver 230 is responsible for obtaining positions from the input adapters 300, 305, 310, converting the positions into a map (e.g., a set of name-value pairs), and placing the positions into an input queue of a position controller 325. The position controller 325 initiates a position-valuation process. As further described below, the position controller 325 also is responsible for placing a position into a cache of a load collector 355, which holds the position until its valuation is complete.

The position controller 325 receives, in its input queue, messages that contain position information in a raw format. These messages are received from the position receiver 325. The position controller 325 functions to construct a position object by retrieving asset information from the asset-data database 245 with help from an asset-data broker 345.

A position object includes a map (e.g., a set of name-value pairs) of position attributes, references to the asset information in the asset-data database 245 of the asset-data broker 345, references to market-data information in the market-data database 255 of the market-data broker 350, references to appropriate valuation models, and probability distributions created as a result of valuation. The position object itself is held in the cache of the load collector 355.

The position controller 325, a risk-exposure controller 330, and a valuation-range controller 335 (collectively referred to as "the controllers" with respect to FIG. 3) operate on references (tokens) to the position object and not on the position object itself. Only the references (tokens) are passed between the controllers 325, 330, 335. This process of passing tokens as opposed to the position objects themselves significantly reduces the overhead associated with the distributed nature of the valuation process, thus greatly improving the response time and throughput of the system 200.

The position controller 325 also functions to construct valuation adapters from rules contained in the rules database 250, with assistance from a product-information broker 340. A valuation adapter is an element primarily responsible for processing a valuation. A valuation adapter connects or links a position, its prices, its asset, and its valuation method with each other. The valuation method (model) for the position is contained in system libraries 370, which are referenced by the rules database 250 on a position-by-position basis. Each position has its own unique method of valuation, which is accomplished by retrieving appropriate combinations of routines from the system libraries 370. The valuation adapters control the execution of preparations for a valuation process as well as a valuation itself, by using a valuation method retrieved from the system libraries 370. The position controller 325 constructs market-data requests and populates prices for a position object from the market-data database 255, with assistance from the market-data broker 350.

A product-information broker 340 is responsible for producing a correct set of valuation adapters for a position based on the position's instrument and rules of a business unit holding the position. A model used for valuation of a particular position is dependent on the position's instrument, a business area or unit where the position originated, and a hypothetical scenario for which the position is to be valued. For example, the same bond can be valued using duration for one business area or unit, using duration and convexity for another business area or unit, and using full valuation if the scenario involves large moves in a yield curve. The product-information broker 340 uses a set of rules stored at metadata in the rules database 250 to analyze characteristics of a position and to correctly assign a proper valuation model and methodology for the position.

The asset broker 345 is responsible for providing asset information to the valuation adapters. The asset broker 345 is implemented in the broker pattern 500, as described above with respect to FIG. 5. The asset broker 345 serves as a repository of valuation-related data required during a valuation process. The valuation-related data required to perform valuation of a position differs from instrument to instrument. For a bond, valuation data normally includes of coupon, accretion, amortization, and reset schedules, if applicable. For an option, valuation data may include information about an underlying instrument, and so on. These data are used by a valuation-model implementation library in the system libraries 370 to produce a series of hypothetical profits and losses.

The position controller 325 is responsible for obtaining market data from the market-data database 255 and asset data from the asset-data database 245 required for valuation of a position, performing a preliminary valuation, such as computing sensitivities that are to be used in the valuation process, and obtaining from the product-information broker 340 nomenclature of risk exposures required for the position as well as valuation methodologies for each of the risk exposures. The position controller 325 creates risk-exposure objects, associates the risk-exposure objects with a position, and places each of the risk exposures into an input queue of the risk-exposure controller 330, thus initiating a valuation process of the risk exposure. It should be noted that there may be multiple risk exposures associated with a given position. For example, a convertible bond of a foreign corporation has equity, interest, foreign-exchange, and credit-risk exposures, as well as a full risk exposure. Each risk exposure may require its own valuation methodology and market data.

The risk-exposure controller 330 obtains a list or set of scenarios, according to which a risk exposure is to be valued. The set of scenarios is a configuration parameter of the valuation system 200. The risk-exposure controller 330 creates a set of hypothetical markets for each scenario, evaluates duration of valuation for each scenario, and breaks the set of scenarios into ranges in order to achieve a uniform elapsed valuation time per range. The particular valuation methodology employed depends on the scenario. For example, if a scenario involves large curve moves, full valuation may be required. If a scenario includes only small market moves, valuation using sensitivities may be sufficient. Therefore, valuation times for scenarios in the set may not be equal, and the number of scenarios in the ranges may be different.

The risk-exposure controller 330 is responsible for assigning a risk exposure to a cell in a multi-dimensional cube. The risk-exposure controller 330 also analyzes attributes of the risk exposure and assigns values for each of the cube's coordinates.

The valuation-range controller 335 is responsible for valuing a risk exposure according to scenarios contained in a range. As previously described, data for valuing a risk exposure in a range is passed to the valuation-range controller 335 from the risk-exposure controller 330. The valuation-range controller 335 forms an invocation sequence for an appropriate mathematical routine, and passes hypothetical market data and risk exposure parameters to the invocation sequence. The valuation-range controller 335 then obtains a market-value result and posts the result to a vector of profits and losses. When all scenarios in the range have been valued, the valuation-range controller 335 updates a counter of required valuations for a corresponding position object held in the load collector 355. When all the required valuations are completed for the risk exposure, the valuation-range controller 335 updates a counter of risk exposures (in the valuation-range collector 355). When all the risk exposures for a position have been valued, the valuation-range controller 335 marks the position as complete.

The market-data broker 350 is responsible for maintaining the market data in the market-data database 255. As described above with respect to the generic description of a broker pattern in connection with FIG. 5, if market data being requested is not found in the market-data database 255 of the market-data broker 350, the market-data broker 350 constructs the market data by executing a populate-member function of a price class, derived from a cacheable element. The price class knows how to retrieve raw market data from the market-data database 255, and how to construct required curves.

As briefly described above, the primary responsibility of the load collector 355 is to store (hold) positions while their risk exposures are being valued. The load collector 355 collects positions whose valuations have been completed, batches those positions together for better throughput, and loads the valued positions into the risk-positions database 260. Alternatively, the load collector 355 sends the valued positions into an output stream. Output adapters, such as a database adapter 360, serve as output-stream helpers. The database adapter 360 performs formatting functions to assist the load collector 355 in loading the valued positions into the risk-positions database 260. The load collector 355 also performs transaction management and database-error management. Other media adapters in addition to or instead of the database adapter 360 may be used. For example, a network adapter may be used if the output stream of valued positions is designated for other media, such as a network, instead of the risk-positions database 260.

As described above, the risk positions contained in the risk-positions database 260 is an external representation of a cell in a multi-dimensional cube. Each cell of the cube contains a set of coordinates, a set of hypothetical market values, and non-statistical attributes that are required in a subsequent risk analysis.

The follow describes, in general, an example of the system 200 in operation. The system 200 receives, for example, about 400 input streams per day. An input stream is either a file from a feeder system, or an XML message from front-end applications. The input streams contain positions that require valuation. The positions are loaded into the positions database 210 as a batch. Indicative information about the batch is sent to the valuation/risk engine 240. Upon receiving the batch, the position receiver 320 opens an input stream. In the case of a database, the input stream results from a set of SQL statements; in the case of a network, the input stream flows via a network connection. The position receiver 320 transforms a position into an internal form and sends the position to the position controller 325 for valuation. At the same time, the position receiver 320 sends the position to the load collector 355. The position is kept in a cache of the load collector 355 until the position is fully valued.

The position controller 325 obtains market data and asset data required for valuation of the position, as well as nomenclature of risk exposures for the position. The market data and the asset data are obtained by the position controller 325 with the assistance of the asset-data broker 345 and the market-data broker 350. The position controller 325 also identifies what methodologies should be used for valuation of the position with the assistance of the product-information broker 340. The position controller 325 then creates risk exposures and sends them to the risk-exposure controller 330, one by one.

The risk-exposure controller 330 identifies a set of scenarios for valuation. The set of scenarios is different from day to day, and from position to position within a day. The set of scenarios is dependent on market conditions and is created upon request from, for example, risk management staff. The risk-exposure controller 330 breaks the set of scenarios into subsets (e.g., ranges), based on an estimated valuation time and a ratio of valuation time to a dispatching time. Each range of scenarios is sent to the valuation-range controller 335. The valuation-range controller 335 functions to call valuation routines contained in the system libraries 370. The valuation-range controller 335 prepares call parameters from the market data and the asset data as well as position data for the position being valued. The market data for the position being valued is modified according to a definition of the scenario. At any given moment, there are multiple positions, risk exposures, and scenario ranges that are being processed by the system 200. When a position has been fully processed (all scenarios for each risk exposure have been valued), the position is removed from the cache of the load collector 355 and sent to the output stream. For better throughput, positions that have been valued are batched before being sent.

Figure 6:
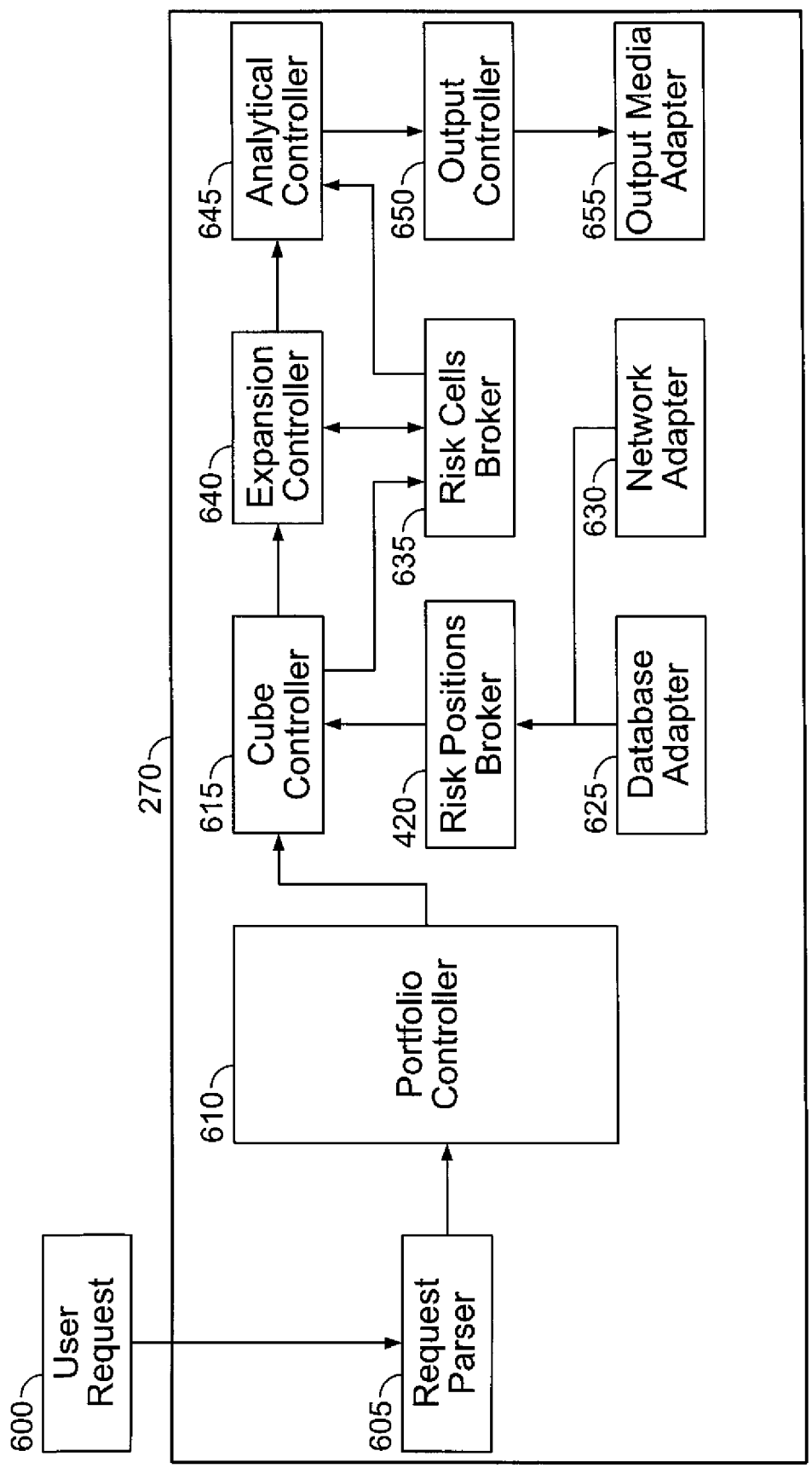
FIG. 6 schematically illustrates a query subsystem according to an embodiment of the present invention.

FIG. 6 schematically illustrates the query subsystem 270 of the system 200. The query subsystem 270 builds a multi-dimensional cube based on contents of a query request 600 submitted by a user, processed by a front-end unit, and passed the query subsystem 270 for processing. The organization and contents of the cube is based on criteria specified in the query request and data stored in the risk-positions database 260 or received from the hypothetical-positions database 265 through the valuation/risk engine 240 (see FIG. 2).

Figure 7:
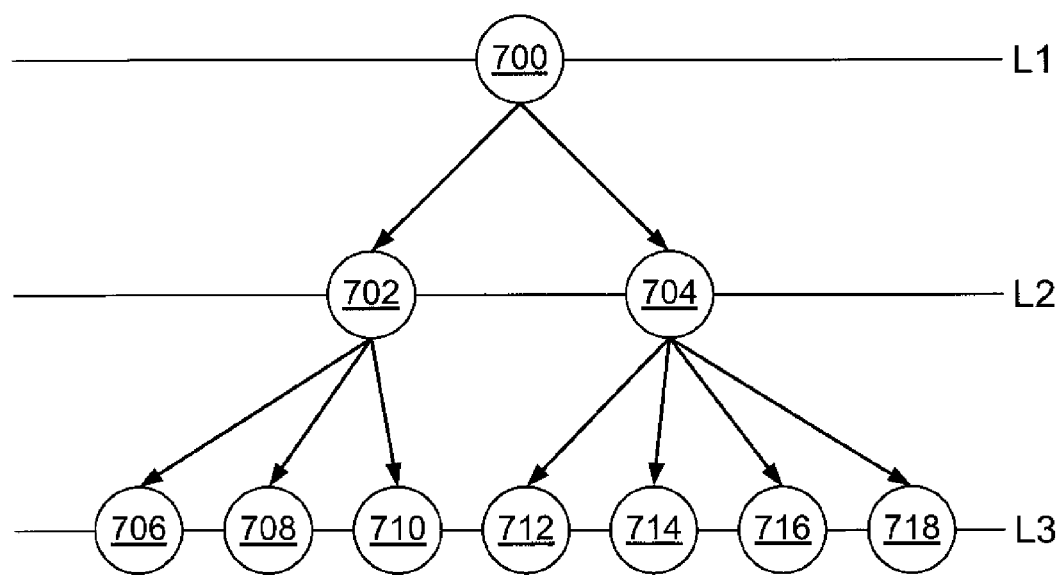
FIG. 7 schematically depicts a data hierarchy for a multi-dimensional cube.
Figure 8:
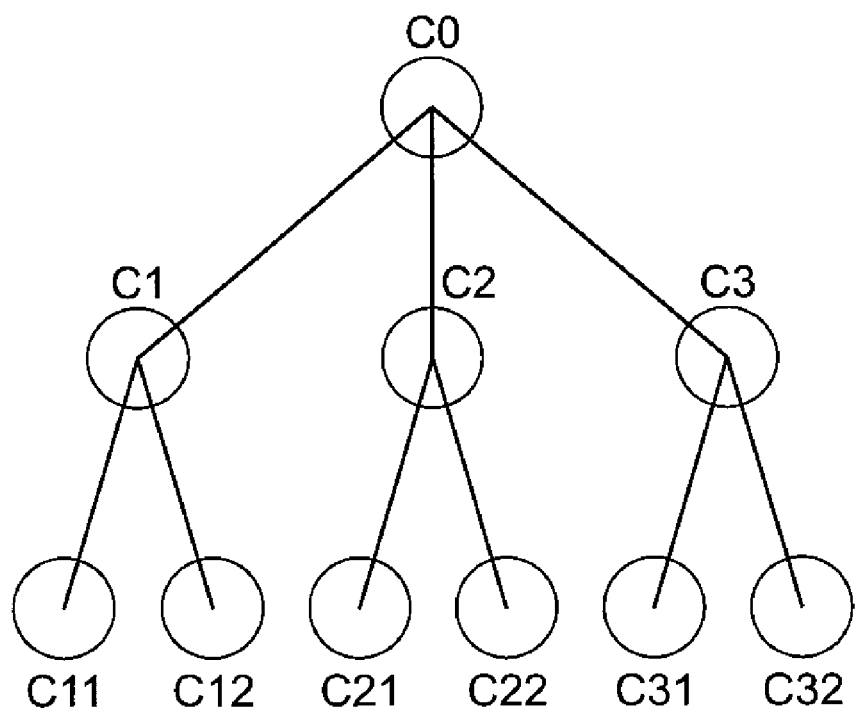
FIG. 8 schematically depicts a data hierarchy with a tree structure.
Figure 9:
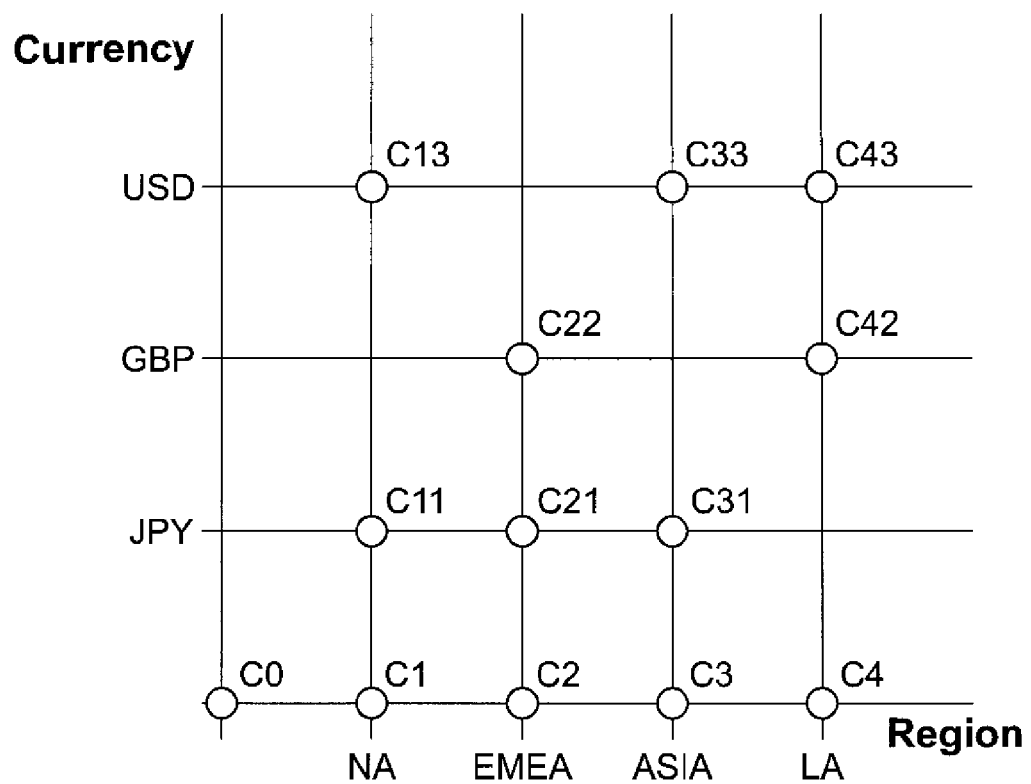
FIG. 9 schematically depicts a data hierarchy as a multi-dimensional cube.
Figure 10:
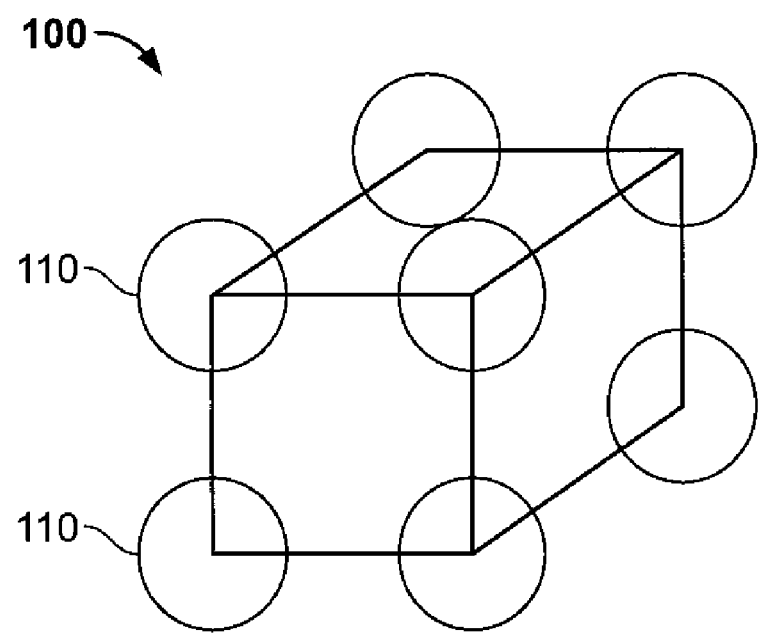
FIG. 10 schematically depicts a three-dimensional cube.
Figure 11:
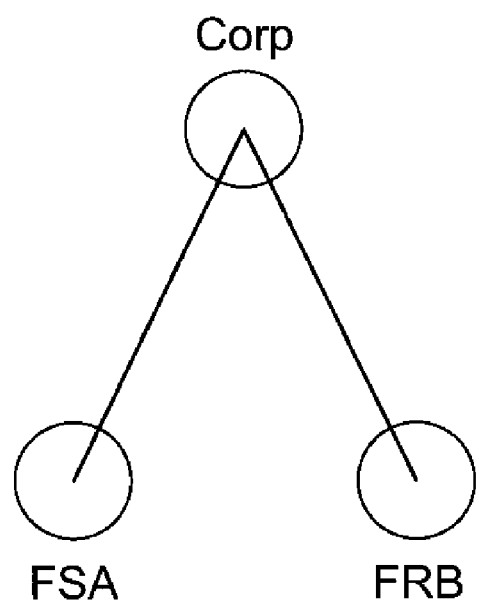
FIG. 11 schematically depicts a data hierarchy with a tree structure.

As previously described, the risk-positions database 260 represents a database implementation of a compressed cube. Only leaf-level nodes of data hierarchies of a multi-dimensional cube are stored in the risk-positions database 260. FIG. 7 schematically illustrates an example of a data hierarchy of a multi-dimensional cube. Preferably, there are twenty three (23) dimensions in the cube. Each dimension has multiple data hierarchies. Each data hierarchy has multiple levels. Circles (nodes) 700, 702, 704, 706, 708, 710, 712, 714, 716, 718 in FIG. 7 represent nodes of a data hierarchy, and horizontal lines L1, L2, L3 represent levels of the data hierarchy. The top node 700 in FIG. 7 is called the root node, and the nodes 706, 708, 710, 712, 714, 716, 718 are called leaf nodes. The top level L1 in FIG. 7 is called a root level, and the level L3 is called a leaf level.

According to the present invention, attributes of positions that may be used to select and aggregate data in a query are referred to as dimensions (as mentioned above, preferably there are twenty three (23) dimensions). Some common examples of attributes used in queries include business organization, currency, etc. The query engine or subsystem 270 uses one or more of the dimensions to classify positions.

The nodes 700, 702, 704, 706, 708, 710, 712, 714, 716, 718 represent a set of allowable values for a dimension. A node ID is a numeric representation of an allowable value for a given dimension. The nodes 700, 702, 704, 706, 708, 710, 712, 714, 716, 718 are unique within a dimension (i.e., that value can exist only once). However, the same node value may exist in different dimensions (e.g., United States Dollar (USD) has a value X in the currency dimension and Y in the instrument dimension). There is no connection between two different nodes having the same value, because they belong to two different dimensions. During loading of a position file, the loading process tries to match the value of each attribute to an existing node of a corresponding dimension.

Designating attributes of positions as nodes 700, 702, 704, 706, 708, 710, 712, 714, 716, 718 allows for building correspondence between the nodes 700, 702, 704, 706, 708, 710, 712, 714, 716, 718 and hence a correspondence between the attributes. As schematically illustrated in FIG. 7, the query subsystem 270 of the system 200 implements data hierarchies (trees) of nodes. A data hierarchy is specific to a dimension, just as a node is specific to a dimension. Some of the nodes 700, 702, 704, 706, 708, 710, 712, 714, 716, 718 may be created as part of a data hierarchy and may not directly represent an attribute of a position (e.g., "North America" could be a node in the currency dimension having child nodes corresponding to USD and Canadian Dollars (CAD)). In other cases, different positions may map to different levels of a data hierarchy. For example, a New York/London trading location has two child nodes: New York and London. Some of the raw position feeds 215 have feeds in New York or London, and others may sit directly at the New York/London node.

A query or user request 600 (see FIG. 6) sent to the query engine or subsystem 270 includes three basic criteria: selection criteria; display criteria; and a set of characteristics. There also are optional criteria that may be specified by a user.

A selection criterion specifies what positions from the general universe will be included in the portfolio to be analyzed. A selection criterion includes node numbers, and an inclusion and/or exclusion clause. An example of a selection criterion is "INCLUDE:702:704:EXCLUDE:706:714." For this example, all positions containing the nodes 702, 704, 708, 710, 712, 716, 718 must be included in the analyzed portfolio. Specifying a node means specifying all its descendants.

A display criterion specifies the dimensionality of a resulting portfolio and the level of aggregation. A display criterion includes display lines with the following structure: DIS:<hierarchy name>:<level name>. The number of display lines identifies the dimensionality of the portfolio. The level name identifies the level of aggregation. For example, if the level L1 from FIG. 7 is specified, positions referencing the nodes 702, 706, 708, 710 are aggregated and assigned to the node 702; positions referencing the nodes 704, 712, 714, 716, 718 are aggregated and assigned to the node 704; and positions referencing the node 700 are aggregated and assigned to a special unclassified node.

The set of characteristics specifies which statistical characteristics of every aggregated position (referred to as a cell) are to be calculated. Examples of characteristics include: mean; VaR at 99% confidence level; VaR at 97% confidence level; VaR at 95% confidence level; VaR at 1 standard deviation; standard deviation; marginal VaR at 99% confidence level in respect to the portfolio; incremental VaR at 99% confidence level in respect to the portfolio; skewness; kurtosis; outliers; fatness; trends at various lookback periods; idiosyncratic risk; and default/downgrade risk.

A query or user request 600 may specify multiple portfolios to be analyzed. In such a case, the selection criterion for each of the portfolios may be different, but the display criterion and the set of characteristics for each of the portfolios must be the same. The query subsystem 270 analyzes these portfolios and provides pair-wise comparisons for each of the specified characteristics.

The optional criteria is a clause utilized by a user to specify whether results of the query or user request 600 are to include total cells and/or corresponding information of additional detail data. If the user request 600 specifies that no total cells are to be calculated, then certain measures, which depend on calculated totals, will not be available. In a preferred embodiment, this clause is optional. By default, (i.e., if the clause is not specified) the results of the query or user request 600 will include calculated totals, but will not include the detail data.

Returning to FIG. 6, the following is a description of elements and an operation of the system 270. The system 270 uses the same controller and broker architecture as described above with respect to the valuation/risk engine 240. A request parser 605 parses the query or user request 600, identifies what portfolios need to be constructed, and passes a description of each portfolio to the a portfolio controller 610. The portfolio controller 610 builds a selection statement that corresponds to a selection criterion of the portfolio contained in the user request 600 and initiates execution of the user request 600. Resultant streams of risk positions are transformed into risk-position objects in a database adapter 625 or a network adapter 630, depending on a stream's source. Risk positions from the positions database 260 enter the query sub system 270 through the database adaptor 625. Hypothetical risk positions from the hypothetical positions database 265 (through the valuation/risk engine 240) enter the query sub system 270 through the network adapter 630. Risk-position objects from both sources are stored in a risk-positions broker 620.

A cube controller 615 requests risk-positions objects from the risk-positions broker 620 as they arrive. The cube controller 615 aggregates the risk positions to a requested aggregation level, as described above, and stores resulting risk cells into a risk-cells broker 635. After all risk positions are thus processed, the cube controller 615 passes control to an expansion controller 640.

The expansion controller 640 is responsible for building total cells. A total cell is a risk cell that contains an aggregation of other risk cells along one or more dimensions. For example, if a portfolio is a two-dimensional cube with the following risk cells: (n1,n3), (n1,n4), (n2,n3), and (n2,n4), then the two-dimensional cube has 5 total cells as follows:

(t,n3) contains an aggregate of (n1,n3) and (n2,n3);
(t,n4) contains an aggregate of (n1,n4) and (n2,n4);
(n1,t) contains an aggregate of (n1,n3) and (n1,n4);
(n2,t) contains an aggregate of (n2,n3) and (n2,n4); and
(t,t) contains an aggregate of all four of the above risk cells.

After the expansion controller 640 builds the total cells, it passes control to an analytical controller 645. The analytical controller 645 is responsible for calculating requested characteristics for each of the risk and total cells, using a probability distribution of each cell, and passes the characteristics to an output controller 650. The output controller 650 uses an output-media adapter 655 to serialize-out cell objects according to requirements of each respective media, such as database, flat file, Excel, XML, etc.

Figure 12:
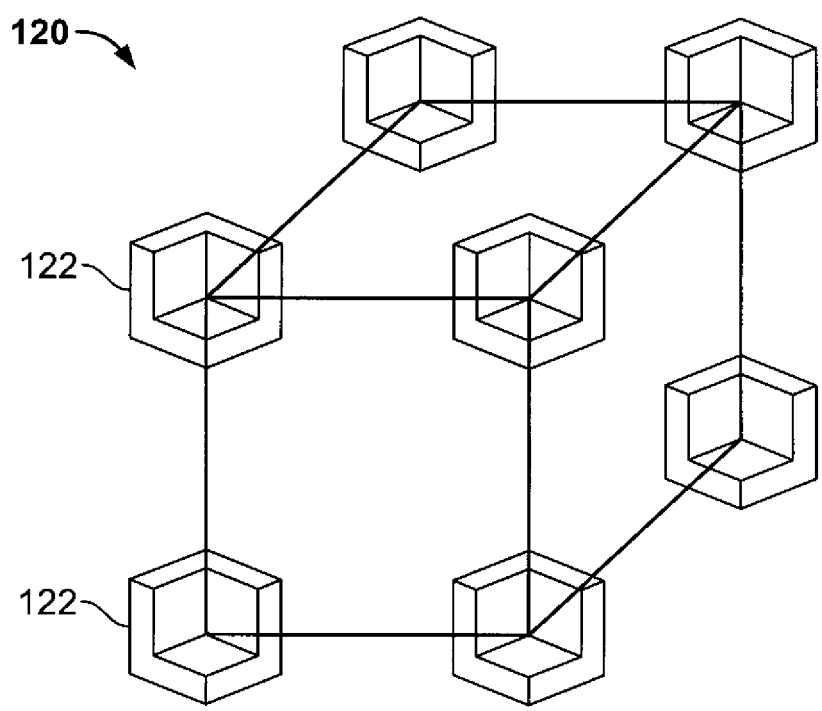
FIG. 12 schematically depicts a multi-layered multi-dimensional cube of three dimensions.

According to another embodiment of the present invention, a data analysis method for analyzing risk positions uses a multi-dimensional risk representation that allows a standard OLAP engine to perform analysis on multi-dimensional data, in which the analysis includes context-dependent, heterogeneous aggregation functions. As schematically shown in FIG. 12, the multi-dimensional data is represented as a multi-dimensional cube 120, which consists of dimensions and cells 122. Each cell 122 includes a set of coordinates and either a scalar measure, a set of scalar and vector measures, or an object that implements calculation models. The set of coordinates contains all dimensions defined in the cube 120, and no more.

According to a preferred embodiment of the present invention, the multi-dimensional risk representation utilizes multi-dimensional data is represented as a multi-layered multi-dimensional cube (referred to herein as an "outer" cube), which consists of dimensions and cells. Each cell includes a set of coordinates and an inner multi-dimensional cube (referred to herein as an "inner" cube). Dimensions of the inner cube include all dimensions required for performing aggregations. Dimensions of the outer cube include only dimensions needed for context (or reporting). The dimensions of the outer cube need not be the same as the dimensions of the inner cube. Each cell of the inner cube contains another cube (sub-inner multi-dimensional cube) and/or a set of scalar and vector measures. That is, the term "multi-layered" derives from the cube within a cube within a cube, etc., structure. The outer cube may have one or more inner-cube layers. Aggregation is performed on the set of measures of the inner cube based on a context for the aggregation provided by the outer cube. In this way, unlike in conventional schemes for representing multi-dimensional data, context information is preserved even when multi-dimensional cubes undergo projection operations resulting in multi-dimensional cubes of fewer dimensions.

Figure 13:
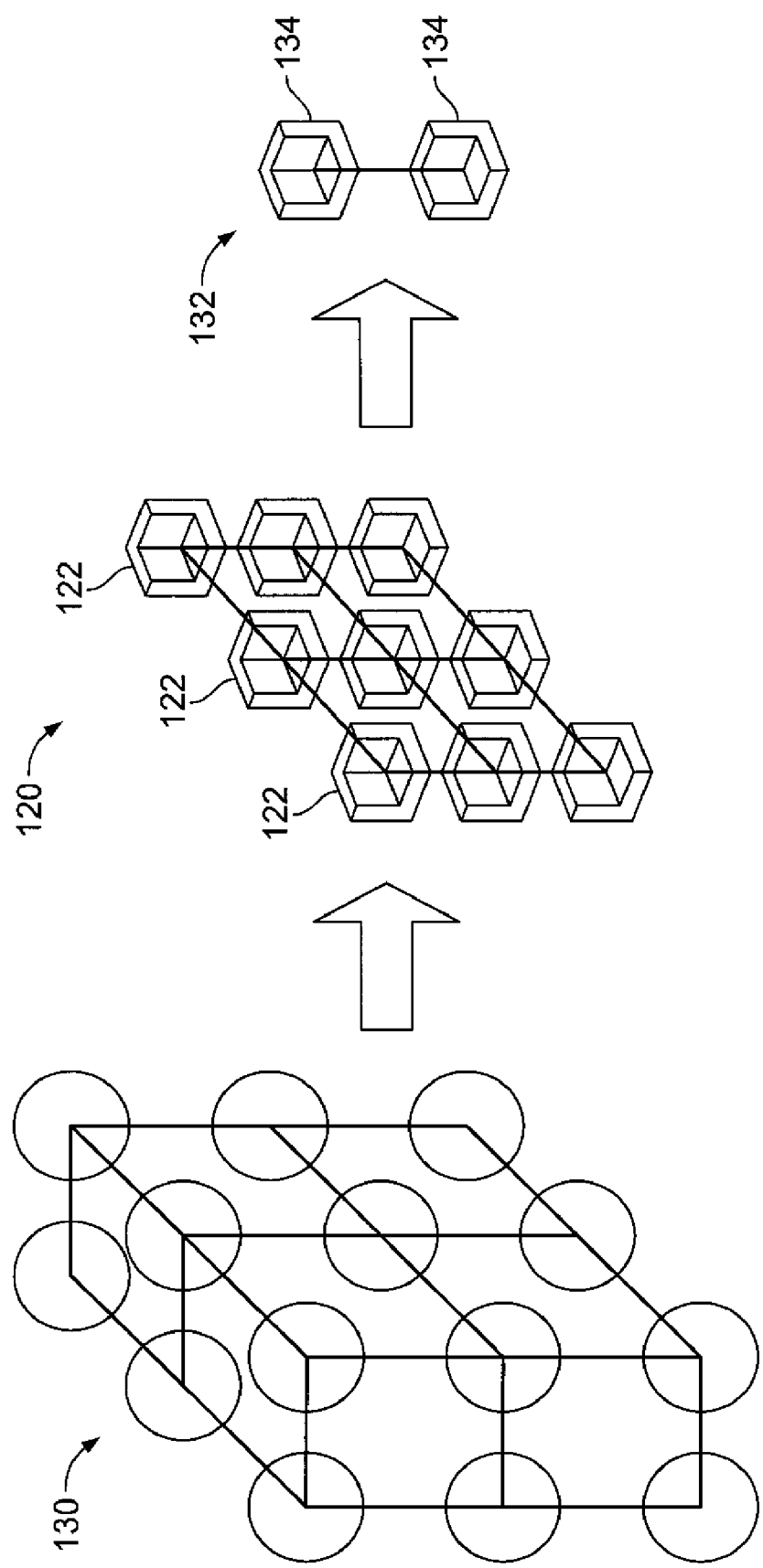
FIG. 13 schematically illustrates a transformation from a conventional multi-dimensional cube to a multi-layered multi-dimensional cube to a projected multi-dimensional cube.

FIG. 13 schematically depicts a transformation from a conventional multi-dimensional (3D) cube 130 consisting solely of cells, to a multi-dimensional (2D) cube 120 consisting of dimensions and cells 122, to a one-dimensional (1D) cube 132 consisting of dimensions and cells 134.

INNER-CUBE STRUCTURE

The term "position" (P) refers to an object consisting of a measure object (M) and a set of coordinates (S). That is P={S, M}. P corresponds to original information ("position information") from which a cell is constructed at a leaf level of a data hierarchy. Position information is added (mapped) to each cell of a multi-dimensional cube. According to a preferred embodiment, P represents information of a risk position of a portfolio of a financial institution.

For an n-dimensional cube, S is given by $S=\{v_1, v_2, v_3, \ldots, v_n\}$. For all k where k is an element of a set that includes 1 through n (i.e., $\forall k, k\in[1, n]$), $v_k$ is a value from a data hierarchy for the $k^{th}$ dimension. M refers to a set of desired measures and defines a summation operator.

The term "cell" (C) refers to an object consisting of a measure object (M) and a set of coordinates (S). That is, $C=\{S, M\}$. For a n-dimensional cube, S is given by $S=\{v_1, v_2, v_3, \ldots, v_n\}$. M refers to a set of desired measures and defines a summation operator.

If, for all k where k is an element of a set that includes 1 through n (i.e., $\forall k, k\in[1, n]$), $v_k$ is a value from a data hierarchy for the $k^{th}$ dimension, then the cell is called a body cell. That is, the cell has not undergone a previous projection and thus has all of its original dimensions.

If there is exactly one k that is an element of the set that includes 1 through n (i.e., $k\in[1, n]$) for which $v_k$ is "−" or negative, then the cell is called a total cell of $(n-1)^{th}$ order. That is, the cell has previously undergone one projection and its original dimensions have been reduced by one.

If there are exactly two values of k that are elements of the set that includes 1 through n (i.e., $k\in[1, n]$) for which $v_k$ is "−" or negative, then the cell is called a total cell of $(n-2)^{th}$ order. That is, the cell has previously undergone two projections and its original dimensions have been reduced by two.

If there are exactly n−1 values of k that are elements of the set that includes 1 through n (i.e., $k\in[1, n]$) for which $v_k$ is "−" or negative, then the cell is called a "total" cell of $1^{st}$ order. That is, the cell has undergone a total projection and its original dimensions have been reduced to one remaining dimension.

If there are exactly n values of k that are elements of the set that includes 1 through n (i.e., $k\in[1, n]$) for which $v_k$ is "−" or negative, then the cell is called a total cell of $0^{th}$ order, or a "global" total cell. That is, the cell has undergone a global projection and all of its original dimensions eliminated through projections.

All cells have a set of dimensions consisting of identical dimensions.

INNER-CUBE OPERATIONS

Each inner cube performs operations that include: position addition; cube projection; cube roll-up; and cube merge.

A. Position Addition to Inner Cube

For each incoming position P consisting of a measures object ($M_P$) and a set of coordinates ($S_P$) (i.e., $P=\{S_P, M_P\}$), and for each inner-cube cell C consisting of a measures object ($M_C$) and a set of coordinates ($S_C$) (i.e., $C=\{S_C, M_C\}$) such that $\forall k, k\in[1, n]$, a mapping operation for mapping coordinates and measures of the position P to an inner-cube cell C is given by:

$$C\to S_C\to v_k=\{P\to S_P\to v_k|\text{"−"}\}, \text{ set } C\to M_C+=P\to M_P. \quad \text{Equation 1}$$

In other words, in the mapping operation of Equation 1, for each value $v_k$ that belongs to a set of coordinates $S_C$ that belongs to a cell C, and for a corresponding value $v_k$ that belongs to a set of coordinates $S_P$ that belongs to a position P, measures that belong to the position P ($M_P$) are mapped and added to measures that belong to the cell C ($M_C$). This mapping operation takes place for all cells of the inner cube.

B. Inner-Cube Projections

A projection is an operation to collapse or remove a dimension of a cell of an inner cube by projecting that dimension onto other dimension(s) (i.e., the remaining dimension(s)) of the inner cube. In a projection according to the present invention, $I^N=\{C^N\}$ denotes an N-dimensional inner cube as a collection of N-dimensional cells $C^N$. A "roll-up" operation of the inner cube projects the inner cube $I^N$ onto an (N−1)-dimensional cube $I^{N-1}{}_J$, where the dimension J is removed from the set of coordinates. The projection is executed as follows:

For each N-dimensional cell $C^N$ that is an element of the inner cube $I^N$ (i.e., $C^N\in I^N$), and $\forall k, k\in[1, n], k\ne J$, every cell C' of $I^{N-1}{}_J$ is found such that $$I^{N-1}{}_J\to C'\to S_C\to v_k=I^N\to C\to S_C\to v_k, \quad \text{Equation 2}$$

and the following mapping operation is set:

$$I^{N-1}{}_J\to C'\to M_C=f_J^{OC,\mu}(I^{N-1}{}_J\to C'\to M_C, I^N\to C\to M_C), \quad \text{Equation 3}$$

where $f_J^{OC,\mu}(\ldots)$ is a J-dependent aggregation function. The aggregation function also depends on the context determined by the cell of the outer cube to which this inner cube belongs, and the measure currently being calculated. That is, the inner cube $I^{N-1}{}_J$ is formed by collapsing or removing the dimension J by projection onto the remaining dimensions of the inner cube $I^N$ according to the J-dependent aggregation function $f_J^{OC,\mu}(\ldots)$.

C. Inner-Cube Roll-Up

Figure 14:
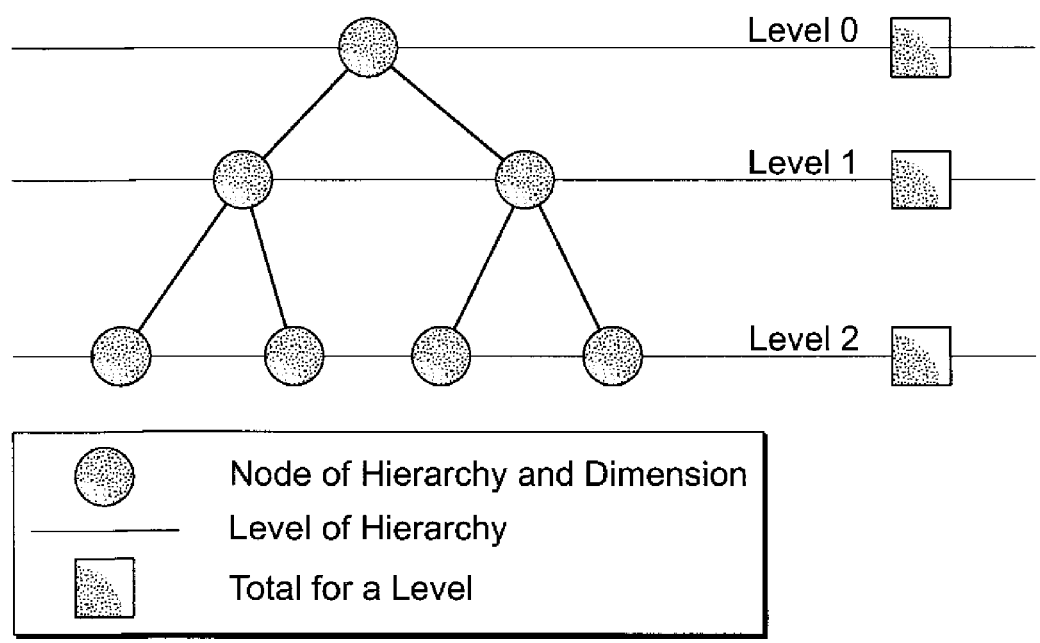
FIG. 14 schematically depicts a structure of data hierarchies of a cube.

FIG. 14 schematically depicts a structure of data hierarchy of a cube. A roll-up is a total projection of a dimension for a level of a data hierarchy. If nodes for dimension j are drawn from level z, i.e., $\forall I^N\to C, I^N\to C\to S_C\to v_j\in\Theta_j^z$, where $\Theta_j^z$ is a set of nodes from a data hierarchy of dimension j at level z, then an inner-cube roll-up from level z to level z−1 is executed as follows:

Let $I^Z{}_J$ denote an inner cube in which a set of values for the $J^{th}$ dimension is drawn from a level Z, and let $I^{Z-1}{}_J$ denote an inner cube in which a set of values for the $J^{th}$ dimension is drawn from a level Z−1. Then, for each cell C∈$I^Z_J$, the cell C' of cube $I^{Z-1}_J$ (for which a value $I^{Z-1}_J \to C' \to S_C \to v_J$ is the parent of a value $I^Z_J \to C \to S_C \to v'_J$) is found such that $$I^{Z-1}_J \to C' \to M_C = f^{Z,OC,\mu}_J(I^{Z-1}_J \to C' \to M_C,$$
$$I^Z_J \to C \to M_C), \quad \text{Equation 4}$$

where $f^{Z,OC,\mu}_J(\ldots)$ is a J-dependent and Z-dependent aggregation function, OC refers to the outer cube, and μ refers to an aggregation methodology. Notice that the aggregation function depends on the context determined by the cell of the outer cube to which this inner cube belongs, as well as the measure currently being calculated. Also notice that a projection eliminating the dimension J (total projection) is equivalent to a roll-up for dimension J.

D. Inner-Cube Merge

In a merge operation in which an inner cube $I^N$ is merged with an inner cube $I'^N$, for each cell C of the inner cube $I^N$ and each cell C' of the inner cube $I'^N$, and ∀k, k∈[1, n], then $$I^N \to C \to S_C \to v_k = I'^N \to C' \to S_C \to v_k \text{ and } I'^N \to C' \to$$
$$M_{C'} += I^N \to C \to M_C. \quad \text{Equation 5}$$

Note that a merge operation may be performed only on cubes with identical sets of dimensions at identical hierarchy levels.

OUTER-CUBE STRUCTURE

Similar to the discussion above in connection with inner cubes, the term "position" (P) refers to an object consisting of a measure object (M) and a set of coordinates (S). That is P={S, M}. P corresponds to original information ("position information") from which a cell is constructed at a leaf level of a data hierarchy. Position information is added (mapped) to each cell of a multi-dimensional cube. According to a preferred embodiment, P represents information of a risk position of a portfolio of a financial institution.

For an n-dimensional cube, S is given by S={$v_1$, $v_2$, $v_3$, ..., $v_n$}. For all k where k is an element of a set that includes 1 through n (i.e., ∀k, k∈[1, n]), $v_k$ is a value from a data hierarchy for the $k^{th}$ dimension. M refers to a scalar of desired measures and defines a summation operator.

The term "cell" (C) refers to an object consisting of a measure object (I) and a set of coordinates (S). That is, C={S, I}. For a n-dimensional cube, S is given by S={$v_1$, $v_2$, $v_3$, ..., $v_n$}. I represents an inner cube whose set of dimensions may be different from the set of dimensions for I's corresponding outer cube.

If, for all k where k is an element of a set that includes 1 through n (i.e., ∀k, k∈[1, n]), $v_k$ is a value from a data hierarchy for the $k^{th}$ dimension, then the cell is called a body cell. That is, the cell has not undergone a previous projection and thus has all of its original dimensions.

If there is exactly one k that is an element of the set that includes 1 through n (i.e., k∈[1, n]) for which $v_k$ is "−" or negative, then the cell is called a total cell of $(n-1)^{th}$ order. That is, the cell has previously undergone one projection and its original dimensions have been reduced by one.

If there are exactly two values of k that are elements of the set that includes 1 through n (i.e., k∈[1, n]) for which $v_k$ is "−" or negative, then the cell is called a total cell of $(n-2)^{th}$ order. That is, the cell has previously undergone two projections and its original dimensions have been reduced by two.

If there are exactly n−1 values of k that are elements of the set that includes 1 through n (i.e., k∈[1, n]) for which $v_k$ is "−" or negative, then the cell is called a "total" cell of $1^{st}$ order. That is, the cell has undergone a total projection and its original dimensions have been reduced to one remaining dimension.

If there are exactly n values of k that are elements of the set that includes 1 through n (i.e., k∈[1, n]) for which $v_k$ is "−" or negative, then the cell is called a total cell of $0^{th}$ order, or a "global" total cell. That is, the cell has undergone a global projection and all of its original dimensions eliminated through projections.

All cells have a set of dimensions consisting of identical dimensions.

OUTER-CUBE OPERATIONS

Each outer cube performs operations that include: position addition; cube projection; cube roll-up; and calculation of measures.

A. Position Addition to Outer Cube

For each incoming position P consisting of measures ($M_P$) and a set of coordinates ($S_P$) (i.e., P={$S_P$, $M_P$}), and for each outer-cube cell C consisting of an inner cube ($I_C$) and a set of coordinates ($S_C$) (i.e., C={$S_C$, $I_C$}) such that ∀k, k∈[1, n], ∀m, m∈[1, j], a mapping operation for mapping coordinates and measures of the position P to a cell C' of the inner cube of the cell C is given by $$C \to S_C \to v_k = \{P \to S_P \to v_k | \text{"−"}\} \text{ and}$$
$$C \to I_C \to C' \to S_C \to v_m = \{P \to S_P \to v_m | \text{"−"}\}, \text{ set}$$
$$C \to I_C \to C' \to M_{C'} += P \to M_P. \quad \text{Equation 6}$$

In other words, in the mapping operation of Equation 6, for a value $v_k$ that belongs to dimension k of a set of coordinates $S_C$ that belongs to a cell C, and for a corresponding value $v_k$ that belongs to dimension k of a set of coordinates $S_P$ that belongs to a position P, and for a value $v_m$ that belongs to dimension m of a set of coordinates $S_{C'}$ that belongs to a cell C' of the inner cube $I_C$ of the cell C, and for a corresponding value $v_k$ that belongs to dimension m of a set of coordinates $S_P$ that belongs to a position P, measures that belong to the position P ($M_P$) are mapped and added to measures that belong to the cell C' of the inner cube of the cell C ($M_{C'}$). This mapping operation is similar to what takes place when adding a position to an inner cube, as discussed above in the section entitled "Position Addition to Inner Cube," and takes place for all inner cubes $I_C$ of the cell C.

B. Outer-Cube Projections

In a projection according to the present invention, $O^N=\{C^N\}$ denotes an N-dimensional outer cube as a collection of N-dimensional cells $C^N$. A "roll-up" operation of the outer cube projects the outer cube $O^N$ onto an (N−1)-dimensional cube $O^{N-1}_J$, where the dimension J is removed from the set of coordinates. The projection is executed as follows:

For each N-dimensional cell $C^N$ that is an element of the outer cube $O^N$ (i.e., $C^N \in O^N$), and ∀k, k∈[1, n], k≠J, every cell C' of $O^{N-1}_J$ is found such that $$O^{N-1}_J \to C' \to S_C \to v_k = O^N \to C \to S_C \to v_k. \quad \text{Equation 7}$$

Then, an inner cube $O^N_J \to C \to I_C$ is merged with an inner cube $O^{N-1}_J \to C' \to I_C$ as described above in the section entitled "Inner-Cube Merge."

C. Outer-Cube Roll-Up

If nodes for dimension j are drawn from level z, i.e, ∀$O^N \to C$ $O^N \to C \to S_C \to v_j \in \Theta^z_j$, where $\Theta^z_j$ is a set of nodes from a data hierarchy of dimension j at level z, then an outer-cube roll-up from level z to level z−1 is executed as follows:

Let $O^Z_J$ denote an outer cube in which a set of values for the $J^{th}$ dimension is drawn from a level Z, and let $O^{Z-1}_J$ denote an outer cube in which a set of values for the $J^{th}$ dimension is drawn from a level Z−1. Then, for each cell C∈$O^Z_J$, the cell C' of the outer cube $O^{Z-1}_J$ (for which a value $O^{Z-1}_J \to C' \to S_C \to v_J$ is the parent of a value $O^Z_J \to C \to S_C \to v'_J$) is found, and an inner cube $O^N_j \to C \to I_C$ is merged with an inner cube $O^{N-1}_j \to C' \to I_{C'}$ as described above in the section entitled "Inner-Cube Merge."

D. Calculation of Measures

For each measure $\mu$ of every outer-cube cell C, an inner cube $C \to M^N_C$ of the cell is projected onto a zero-dimensional cube $C \to M^0_{C,\mu}$, such that $$\mu = f_\mu(C \to M^0_{C,\mu}),\qquad \text{Equation 8}$$

where $f_\mu(\ldots)$ is an aggregation function that may be as simple as a summation operation or as complex as a derivative security-valuation model.

EXAMPLE

The following example shows how the inventive data analysis method for analyzing risk positions, as described above, is applied to the portfolio of positions listed in Table 1.

Figure 15:
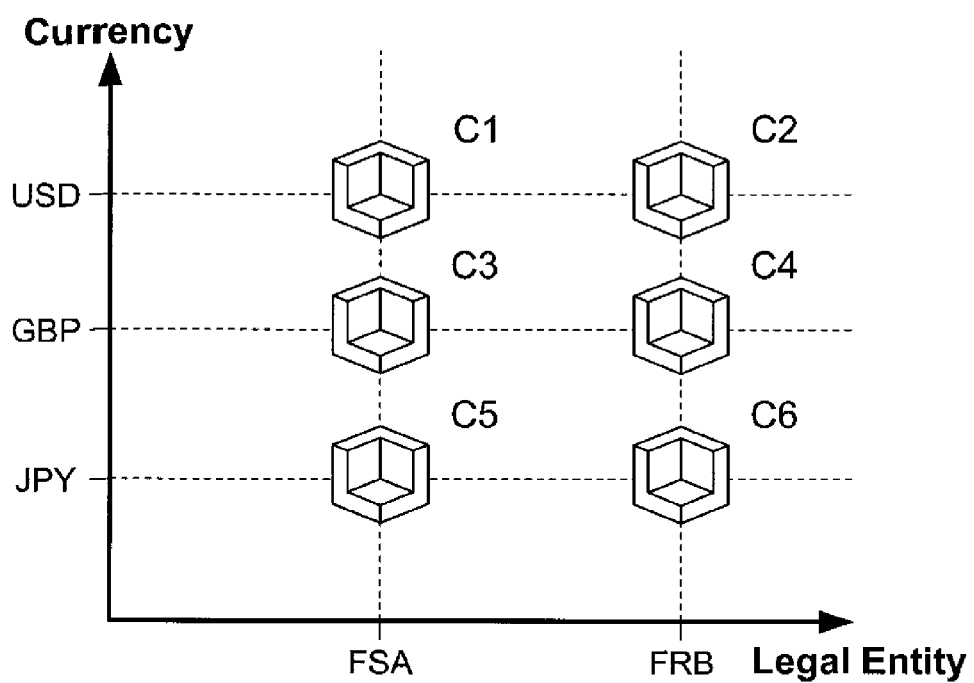
FIG. 15 schematically depicts a 2D multi-layered cube.

The positions in Table 1 are organized as a 2D multi-layered cube with the dimensions Legal Entity and Currency, as schematically shown in FIG. 15. The inner cubes are 1D cubes with the dimension Issuer and two measures: MTM and Exposure. As discussed above, MTM is aggregated by algebraic summation, and Exposure is aggregated by netting for each Issuer separately and then grossing between all Issuers. With this arrangement, cells with inner cubes C1 through C6 in FIG. 15 hold information as shown in Tables 10 through 15, respectively.

TABLE 10

CELL WITH INNER CUBE C1

| Legal Entity | Currency | Issuer | MTM | Exposure |
|---|---|---|---|---|
| FSA | USD | GE | 250 | 20 |
| FSA | USD | GM | 450 | 30 |
| FSA | USD | IBM | −500 | −80 |

TABLE 11

CELL WITH INNER CUBE C2

| Legal Entity | Currency | Issuer | MTM | Exposure |
|---|---|---|---|---|
| FRB | USD | GM | −200 | −20 |
| FRB | USD | GM | 150 | 10 |

TABLE 12

CELL WITH INNER CUBE C3

| Legal Entity | Currency | Issuer | MTM | Exposure |
|---|---|---|---|---|
| FSA | GBP | GE | −300 | −10 |
| FSA | GBP | IBM | 100 | 10 |

TABLE 13

CELL WITH INNER CUBE C4

| Legal Entity | Currency | Issuer | MTM | Exposure |
|---|---|---|---|---|
| FRB | GBP | GM | 300 | 20 |
| FRB | GBP | GM | −300 | −20 |

TABLE 14

CELL WITH INNER CUBE C5

| Legal Entity | Currency | Issuer | MTM | Exposure |
|---|---|---|---|---|
| FSA | JPY | IBM | 450 | 30 |

TABLE 15

CELL WITH INNER CUBE C6

| Legal Entity | Currency | Issuer | MTM | Exposure |
|---|---|---|---|---|
| FRB | JPY | GM | 600 | −50 |

Figure 16:
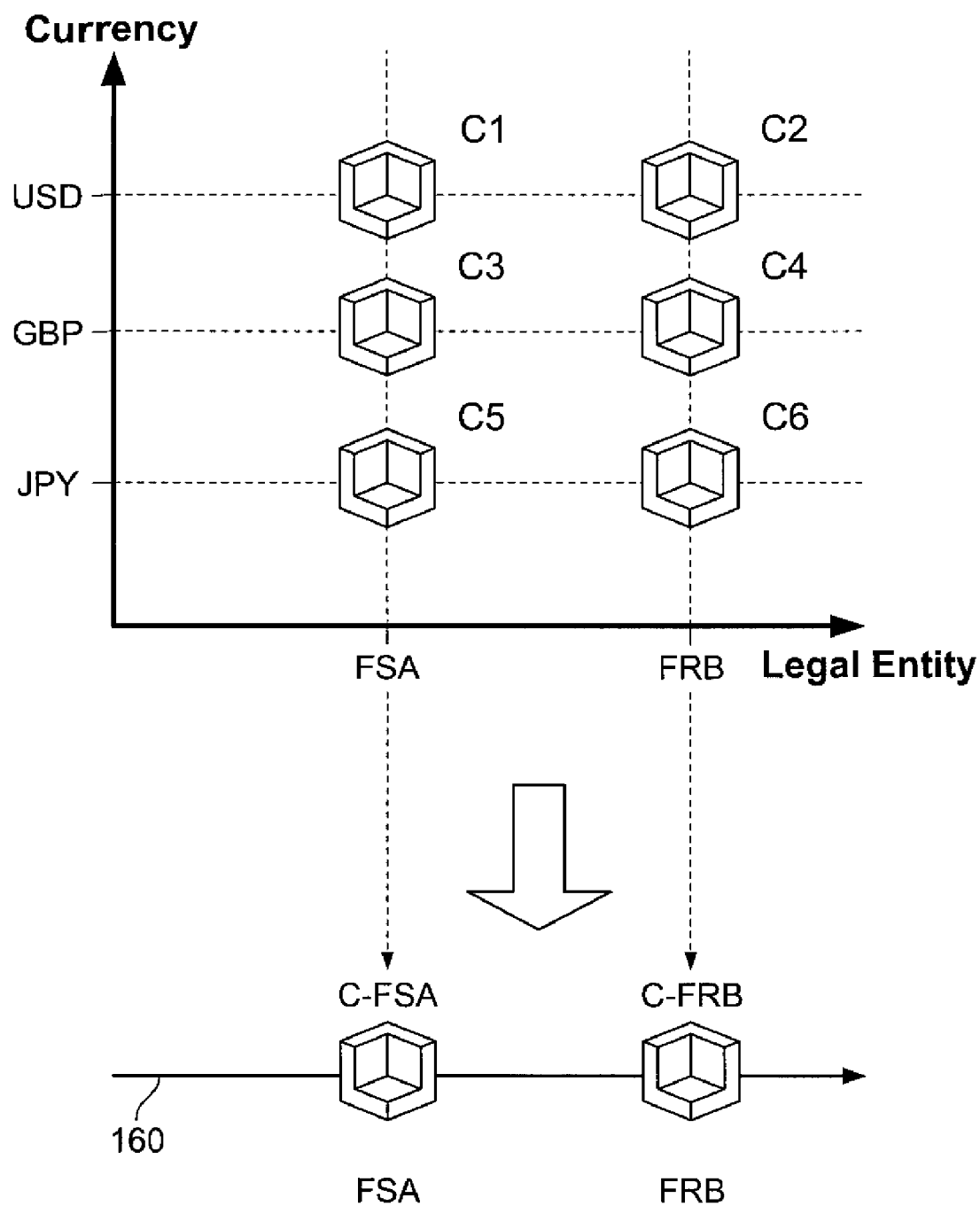
FIG. 16 schematically depicts the 2D multi-layered cube of FIG. 15 projected to a 1D multi-layered cube.

For a query to calculate MTM and Exposure by Legal Entity, analysis of the portfolio of positions listed in Table 1 proceeds as follows:

First, the 2D cube of FIG. 15 is projected onto the dimension Legal Entity, such that a 1D cube 160 results, as schematically depicted in FIG. 16. In FIG. 16, the cell with the inner cube C-FSA is the result of projecting the cell with the inner cube C1, the cell with the inner cube C3, and the cell with the inner cube C5 onto the dimension (Legal Entity) FSA; and the cell with the inner cube C-FRB is the result of projecting the cell with the inner cube C2, the cell with the inner cube C4, and the cell with the inner cube C6 onto the dimension (Legal Entity) FRB. That is, the inner cube of the cell C-FSA is an algebraic aggregation of the inner cube of the cell C1, the inner cube of the cell C3, and the inner cube of the cell C5, with the aggregation results shown in Table 16; and the inner cube of the cell C-FRB is an algebraic aggregation of the inner cube of the cell C2, the inner cube of the cell C4, and the inner cube of the cell C6, with the aggregation results shown in Table 17.

TABLE 16

C-FSA

| Legal Entity | Issuer | MTM | Exposure |
|---|---|---|---|
| FSA | GE | −50 | 10 |
| FSA | GM | 450 | 30 |
| FSA | IBM | −50 | −40 |

TABLE 17

C-FRB

| Legal Entity | Issuer | MTM | Exposure |
|---|---|---|---|
| FRB | GM | 550 | −60 |

Next, the MTM for each Legal Entity is calculated by algebraically summing the MTMs for all issuers. The Exposure for each Legal Entity is calculated by netting the Exposures for each Issuer separately (already done in Table 15) and then grossing between all Issuers. This yields the results shown in Table 18. The results are the same as those computed in the conventional manner, shown in Table 5.

TABLE 18

QUERY RESULTS

| Legal Entity | MTM | Exposure |
|---|---|---|
| FRB | 550 | 60 |
| FSA | 450 | 80 |

Figure 17:
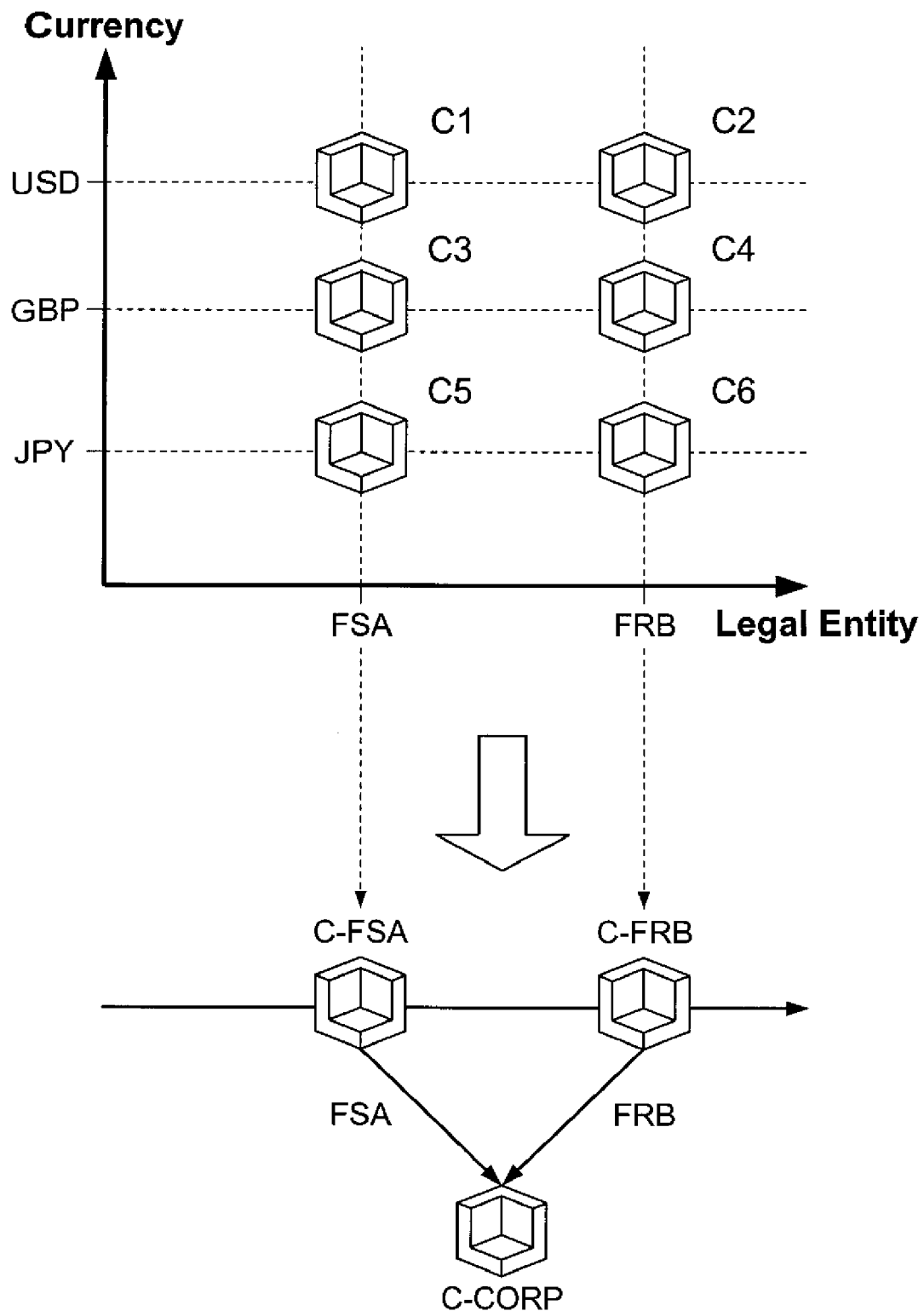
FIG. 17 schematically depicts the 1D cube of FIG. 16 projected to a cube of $0^{th}$ dimension.

FIG. 17 schematically depicts a further aggregation of the 1D multi-layered cube 160 into a multi-layered C-Corp cube of zero dimensions. To obtain the cell C-Corp of the resulting cube, the inner cube of the cell C-FSA of the 1D multi-layered cube 160 and the inner cube of the cell C-FRB of the 1D multi-layered cube 160 are obtained as described above, and an algebraic aggregation of the inner cube of the cell C-FSA cube and the inner cube of the cell C-FRB cube is performed, which yields the results listed in Table 19.

TABLE 19

AGGREGATION OF C-FSA AND C-FRB BY ISSUER

| Issuer | MTM | Exposure |
|---|---|---|
| GE | −50 | 10 |
| GM | 1000 | −30 |
| IBM | 50 | −40 |

Then, the MTMs are algebraically summed, and the Exposures are grossed. Table 20 lists the results of these operations.

TABLE 20

RESULTS FOR C-CORP

| C-Corp | MTM = 1000 | Exposure = 80 |
|---|---|---|

The results in Table 20 are the same as those in Table 7 but were obtained in a generic manner. Through the use of multi-layered and multi-dimensional cubes, context independent and heterogeneous aggregations are possible. Whereas conventional aggregation schemes result in the loss of information as dimensions are eliminated by projections, the data analysis method of the present invention preserves all the original information so that it is possible to obtain the results in Table 20 from the data in Table 19 without having to go back to the original information in Table 1 to perform calculations on data that was lost (eliminated) due to projections.

While the present invention has been described with respect to what is presently considered to be the preferred embodiment(s), it is to be understood that the invention is not limited to the disclosed embodiment(s). To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, although VaR is identified as a measure of risk used by financial institutions for quantitative assessment and comparison purposes, the present invention is applicable to other non-linear measures of risk assessment and management.

As will be appreciated, the inventive methods may be embodied on computer-executable code that is stored on a computer-readable medium, for example, a floppy disk, a hard drive, removable media, an optical memory, a magneto-optical memory, a RAM, a ROM, a flash memory, so-called "memory sticks," and the like.

What is claimed is:

1. A method of representing a portfolio of financial positions on which a risk analysis is to be performed, comprising the steps of:

constructing an outer cube representing the portfolio of financial positions as a multi-layered multi-dimensional cube that includes cells and dimensions; and constructing each cell of the plurality of cells to include a set of coordinates and an inner cube, wherein the inner cube is a multi-dimensional cube that includes cells and dimensions, wherein the dimensions of the outer cube include information relating to a context of the risk analysis, wherein the dimensions of the inner cube include all dimensions required to perform an aggregation operation on the portfolio of financial positions, and wherein, for each position P to be added to an inner-cube cell C, P includes a measures object $M_P$ and a set of coordinates $S_P$, C includes a measures object $M_C$ and a set of coordinates $S_C$, for all k where k is an element of a set that includes 1 through n, and $v_k$ is a value from a data hierarchy for the $k^{th}$ dimension, a mapping operation for mapping coordinates and measures of P to C is given by:

$$C \rightarrow S_C \rightarrow v_k = \{P \rightarrow S_P \rightarrow v_k \text{"--"}\}, \text{ set } C \rightarrow M_C += P \rightarrow M_P.$$

2. A method according to claim 1, wherein a dimension is removed from an inner-cube cell by projecting the dimension to be removed onto one or more other dimensions of the inner cube, such that:

for $I^N = \{C^N\}$, in which $I^N$ denotes an N-dimensional inner cube as a collection of N-dimensional cells $C^N$, $I^N$ is projected onto an (N−1)-dimensional cube ($I^{N-1}_J$), where a dimension J is removed, for each N-dimensional cell $C^N$ that is an element of $I^N$, and for all k where k is an element of a set that includes 1 through n, with k≠J, every cell C' of $I^{N-1}_J$ is found such that $I^{N-1}_J \rightarrow C' \rightarrow S_C \rightarrow v_k = I^N \rightarrow C \rightarrow S_C \rightarrow v_k$, and a mapping operation is set in which $I^{N-1}_J \rightarrow C' \rightarrow M_C = f_J^{OC,\mu}(I^{N-1}_J \rightarrow C' \rightarrow M_C, I^N \rightarrow C \rightarrow M_C)$, where $f_J^{OC,\mu}(\ldots)$ is a J-dependent aggregation function.

3. A method according to claim 1, wherein, for a total projection of a dimension of an inner cube, if $I^Z_J$ denotes an inner cube in which a set of values for a $J^{th}$ dimension is drawn from a level Z, and if $I^{Z-1}_J$ denotes an inner cube in which a set of values for the $J^{th}$ dimension is drawn from a level Z−1, then, for each cell C that is an element of $I^Z_J$, a cell C' of $I^{Z-1}_J$ is found such that $I^{Z-1}_J \rightarrow C' \rightarrow M_C = f_J^{Z,OC,\mu}(I^{Z-1}_J \rightarrow C' \rightarrow M_C, I^Z_J \rightarrow C \rightarrow M_C)$, wherein a value $I^{Z-1}_J \rightarrow C' \rightarrow S_C \rightarrow v_J$ is a parent of a value $I^Z_J \rightarrow C \rightarrow S_C \rightarrow v'_J$, wherein $f_J^{Z,OC,\mu}(\ldots)$ is a J-dependent and Z-dependent aggregation function, wherein OC refers to the outer cube, and wherein μ refers to an aggregation methodology.

4. A method according to claim 1, wherein, in a merge operation in which an inner cube $I^N$ is merged with an inner cube $I'^N$, for each cell C of the inner cube $I^N$ and each cell C' of the inner cube $I'^N$, and for all k where k is an element of a set that includes 1 through n, the merge operation is performed according to:

$$I^N \to C \to S_C \to v_k = I'^N \to C' \to S_C \to v_k \text{ and } I'^N \to C' \to M_{C'} += I^N \to C \to M_C.$$

5. A method of performing risk analysis on a portfolio of financial positions, comprising the steps of:
   constructing an outer cube representing the portfolio of financial positions as a multi-layered multi-dimensional cube that includes cells and dimensions;
   constructing each cell of the plurality of cells to include a set of coordinates and an inner cube, wherein the inner cube is a multi-dimensional cube that includes cells and dimensions,
      wherein the dimensions of the outer cube include information relating to a context of the risk analysis,
      wherein the dimensions of the inner cube include all dimensions required to perform an aggregation operation on the portfolio of financial positions,
   wherein each cell of the inner cube includes a set of measures, which includes at least one scalar measure and at least one vector measure,
      wherein, for each position P to be added to an inner-cube cell C, P includes a measures object $M_P$ and a set of coordinates $S_P$, C includes a measures object $M_C$ and a set of coordinates $S_C$, for all k where k is an element of a set that includes 1 through n, and $v_k$ is a value from a data hierarchy for the $k^{th}$ dimension, a mapping operation for mapping coordinates and measures of P to C is given by:

$$C \to S_C \to v_k = \{P \to S_P \to v_k | \text{"}-\text{"}\}, \text{ set } C \to M_C += P \to M_P;$$
and performing an aggregation operation on the set of measures according to the dimensions of the inner cube and according to the context of the risk analysis included in the dimensions of the outer cube.

6. A method according to claim 5, wherein a dimension is removed from an inner-cube cell by projecting the dimension to be removed onto one or more other dimensions of the inner cube, such that:
   for $I^N = \{C^N\}$, in which $I^N$ denotes an N-dimensional inner cube as a collection of N-dimensional cells $C^N$, $I^N$ is projected onto an (N−1)-dimensional cube ($I^{N-1}_J$), where a dimension J is removed,
   for each N-dimensional cell $C^N$ that is an element of $I^N$, and for all k where k is an element of a set that includes 1 through n, with k≠J, every cell C' of $I^{N-1}_J$ is found such that $I^{N-1}_J \to C' \to S_C \to v_k = I^N \to C \to S_C \to v_k$, and a mapping operation is set in which $I^{N-1}_J \to C' \to M_{C'} = f_J^{OC,\mu}(I^{N-1}_J \to C' \to M_{C'}, I^N \to C \to M_C)$, where $f_J^{OC,\mu}(\ldots)$ is a J-dependent aggregation function.

7. A method according to claim 5, wherein, for a total projection of a dimension of an inner cube,
   if $I^Z_J$ denotes an inner cube in which a set of values for a $J^{th}$ dimension is drawn from a level Z, and
   if $I^{Z-1}_J$ denotes an inner cube in which a set of values for the $J^{th}$ dimension is drawn from a level Z−1, then, for each cell C that is an element of $I^Z_J$, a cell C' of $I^{Z-1}_J$ is found such that $I^{Z-1}_J \to C' \to M_{C'} = f_J^{Z,OC,\mu}(I^{Z-1}_J \to C' \to M_{C'}, I^Z_J \to C \to M_C)$,
   wherein a value $I^{Z-1}_J \to C' \to S_C \to v_J$ is a parent of a value $I^Z_J \to C \to S_C \to v'_J$,
   wherein $f_J^{Z,OC,\mu}(\ldots)$ is a J-dependent and Z-dependent aggregation function,
   wherein OC refers to the outer cube, and
   wherein μ refers to an aggregation methodology.

8. A method according to claim 5, wherein, in a merge operation in which an inner cube $I^N$ is merged with an inner cube $I'^N$, for each cell C of the inner cube $I^N$ and each cell C' of the inner cube $I'^N$, and for all k where k is an element of a set that includes 1 through n, the merge operation is performed according to:

$$I^N \to C \to S_C \to v_k = I'^N \to C' \to S_C \to v_k \text{ and } I'^N \to C' \to M_{C'} += I^N \to C \to M_C.$$

* * * * *